US008042681B2

(12) United States Patent
Chuang

(10) Patent No.: US 8,042,681 B2
(45) Date of Patent: Oct. 25, 2011

(54) DRIVE ROLLER CONTROLLER FOR AN ACCUMULATING CONVEYOR SYSTEM

(75) Inventor: William Chuang, Shulin (TW)

(73) Assignee: Worldwide Logistics Corporation, Shulin (TW)

( * ) Notice: Subject to any disclaimer, the term of this patent is extended or adjusted under 35 U.S.C. 154(b) by 471 days.

(21) Appl. No.: 12/261,289

(22) Filed: Oct. 30, 2008

(65) Prior Publication Data
US 2010/0108472 A1 May 6, 2010

(51) Int. Cl.
*B65G 43/10* (2006.01)
(52) U.S. Cl. ........... 198/783; 198/460.1; 198/781.05; 198/781.06; 193/37; 700/230
(58) Field of Classification Search .............. None
See application file for complete search history.

(56) References Cited

U.S. PATENT DOCUMENTS

| 5,213,201 | A * | 5/1993 | Huber et al. ............. 198/781.06 |
| 6,775,588 | B1 * | 8/2004 | Peck ............................. 700/214 |
| 6,827,202 | B2 * | 12/2004 | Topmiller et al. ........ 198/781.05 |
| 6,959,804 | B2 * | 11/2005 | Helgerson et al. ............ 198/805 |
| 2005/0065641 | A1 * | 3/2005 | Nagai ........................... 700/230 |

* cited by examiner

Primary Examiner — Kavel Singh
(74) Attorney, Agent, or Firm — Burr & Brown

(57) ABSTRACT

A drive roller controller for accumulating conveyor system has a casing and a circuit board. The casing has a front face, two opposite sides and multiple openings respectively defined on opposite sides. The circuit board is mounted inside the casing and has at least a processor, a first and second communicating ports and an input device. The first and second communicating ports are respectively mounted inside openings on the opposite sides of the casing, so a wire is connected between the first and second communicating ports on opposite sides of the adjacent two drive roller controllers. Therefore, the wire is not easily protruded outside the accumulating conveyor unit, so the connection of wire and the drive roller controller is not easily disconnected.

33 Claims, 25 Drawing Sheets

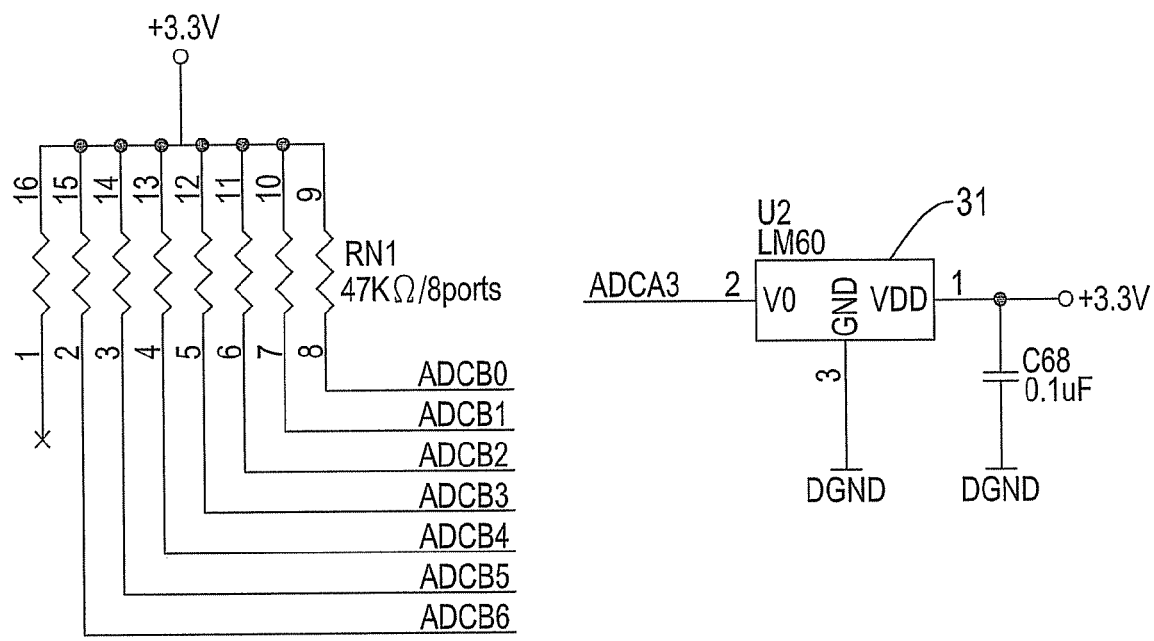
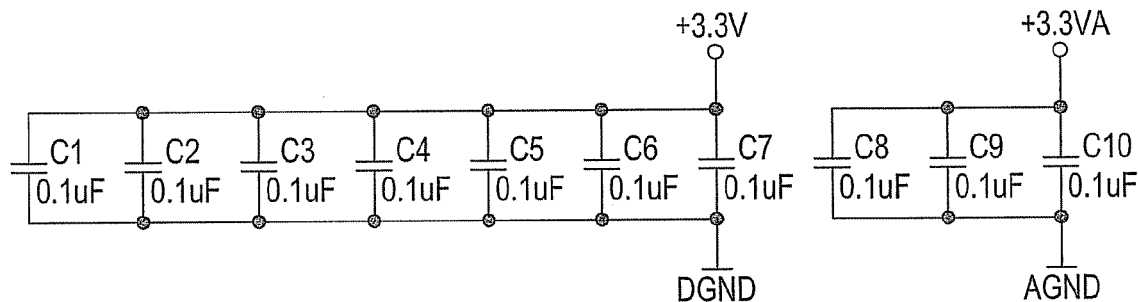
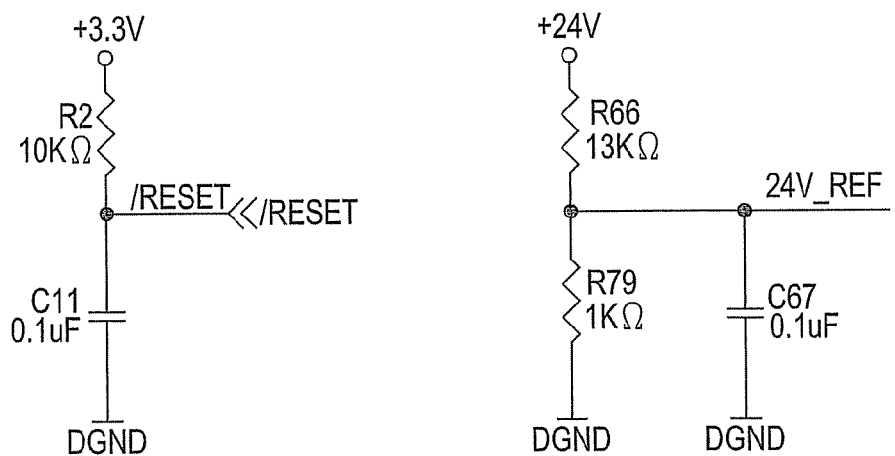
FIG.3D

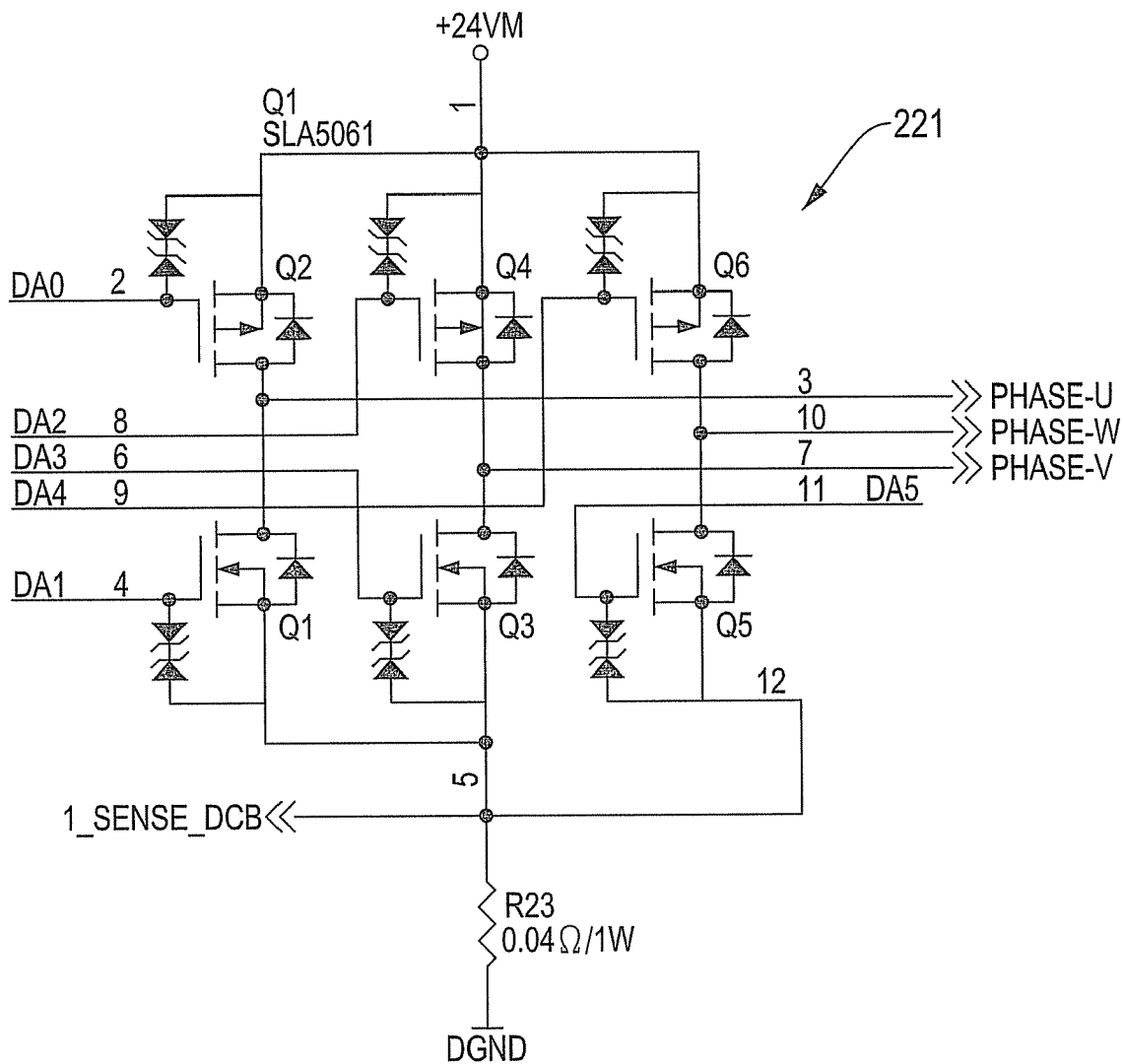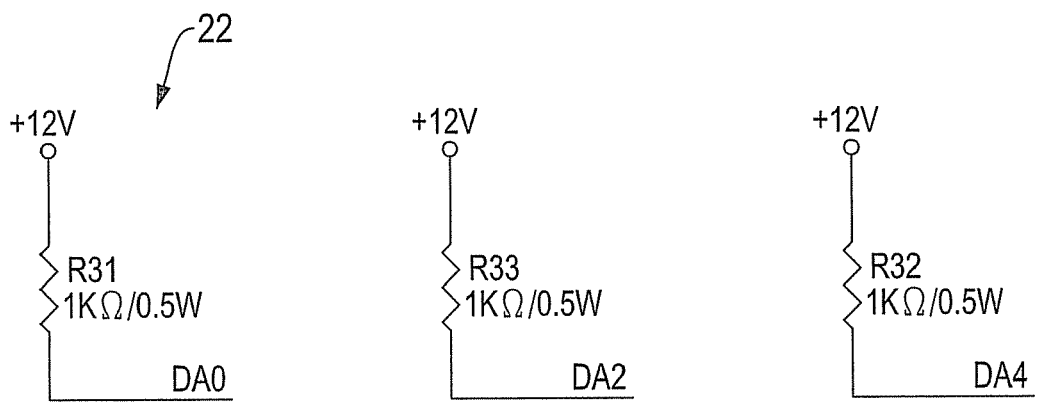
FIG.3E

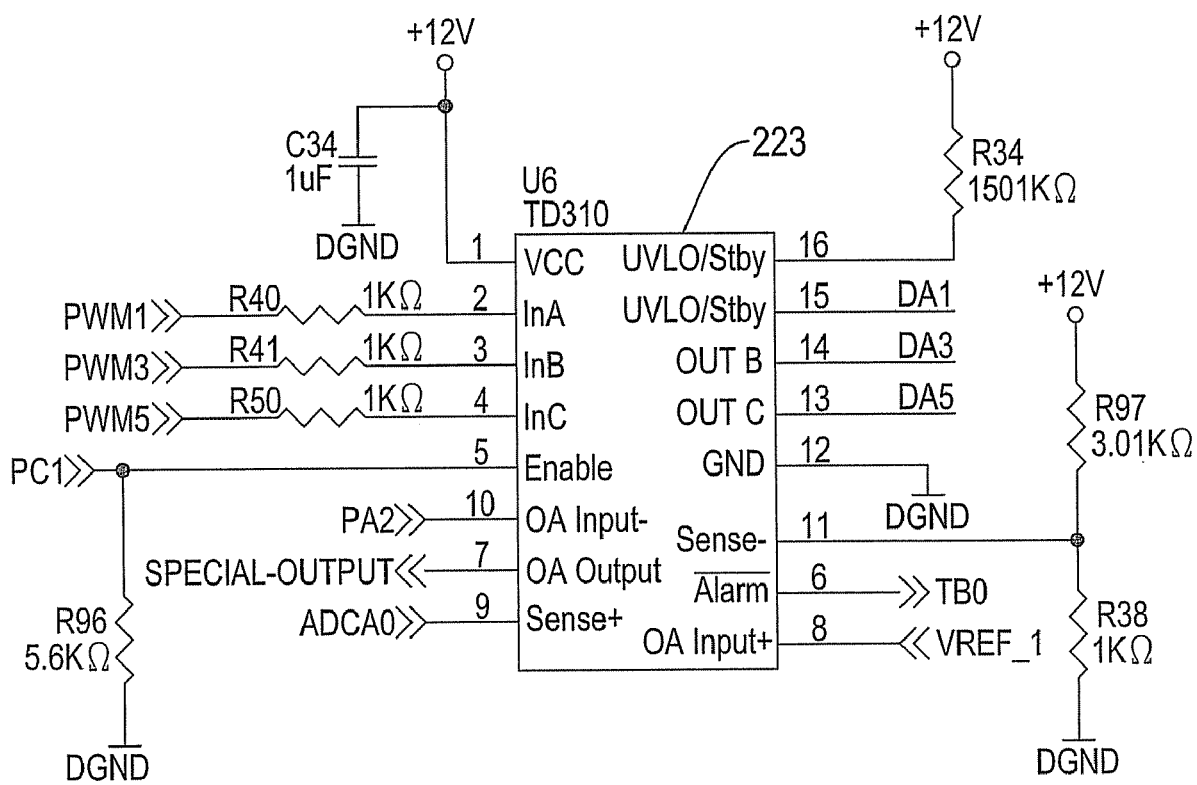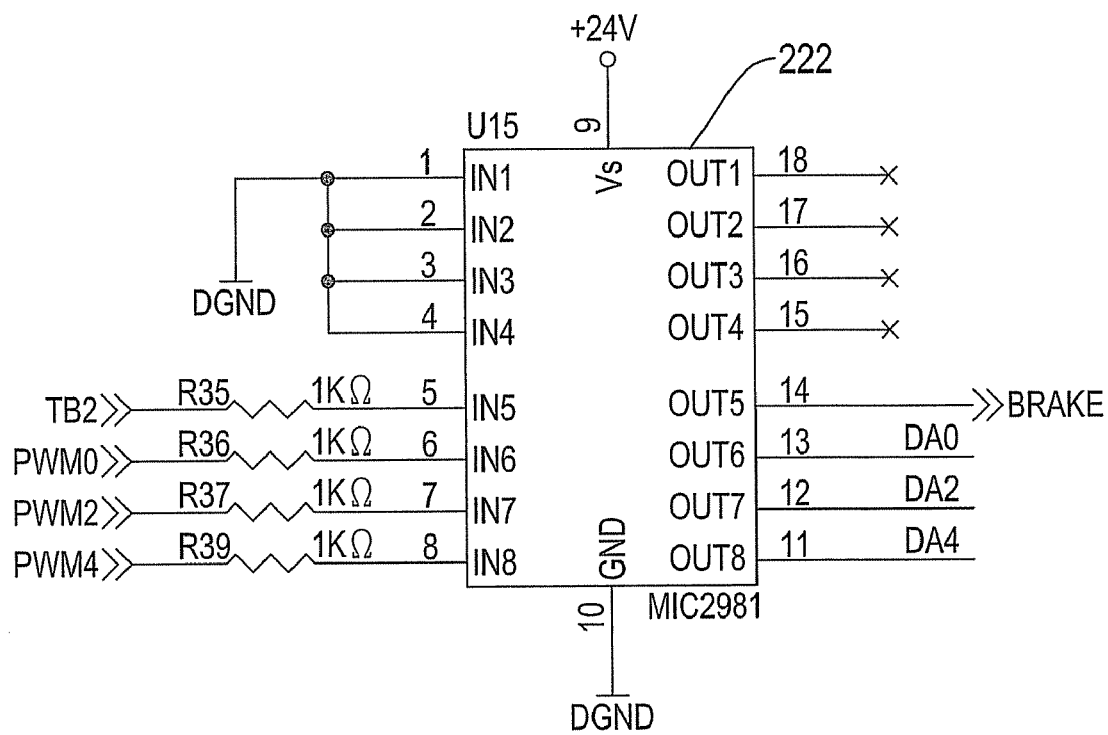
FIG.3F

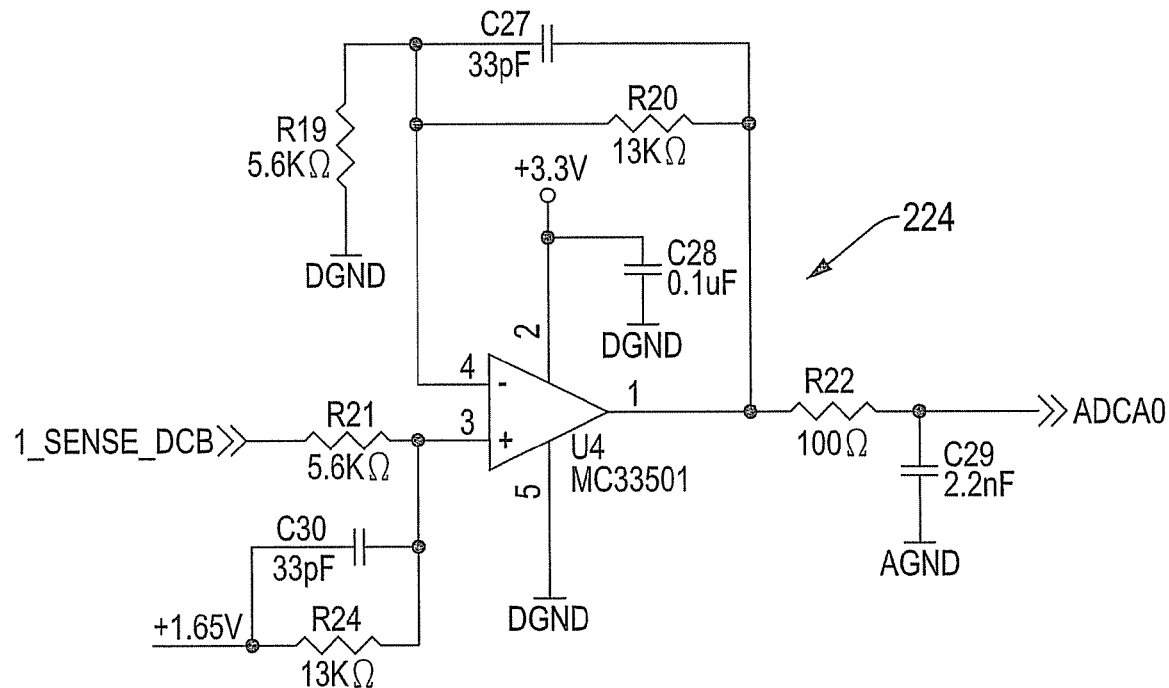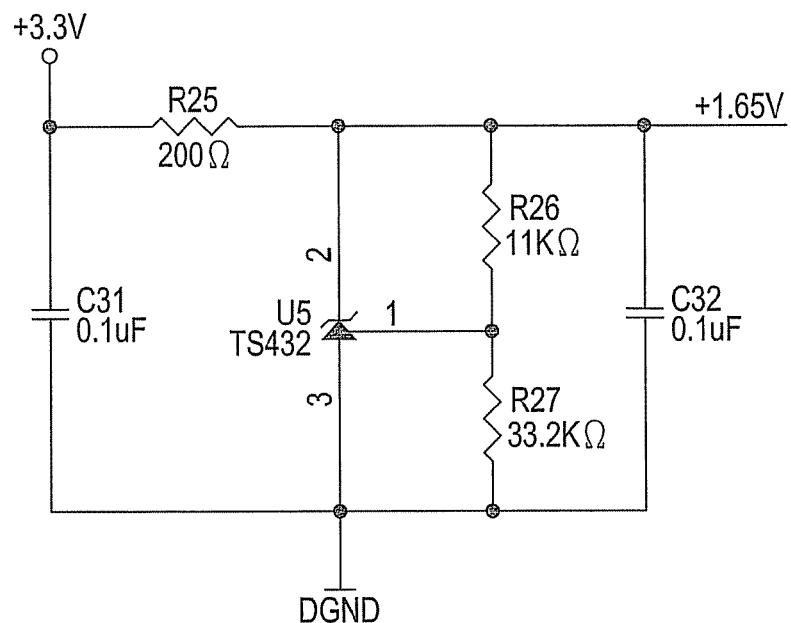
FIG.3G

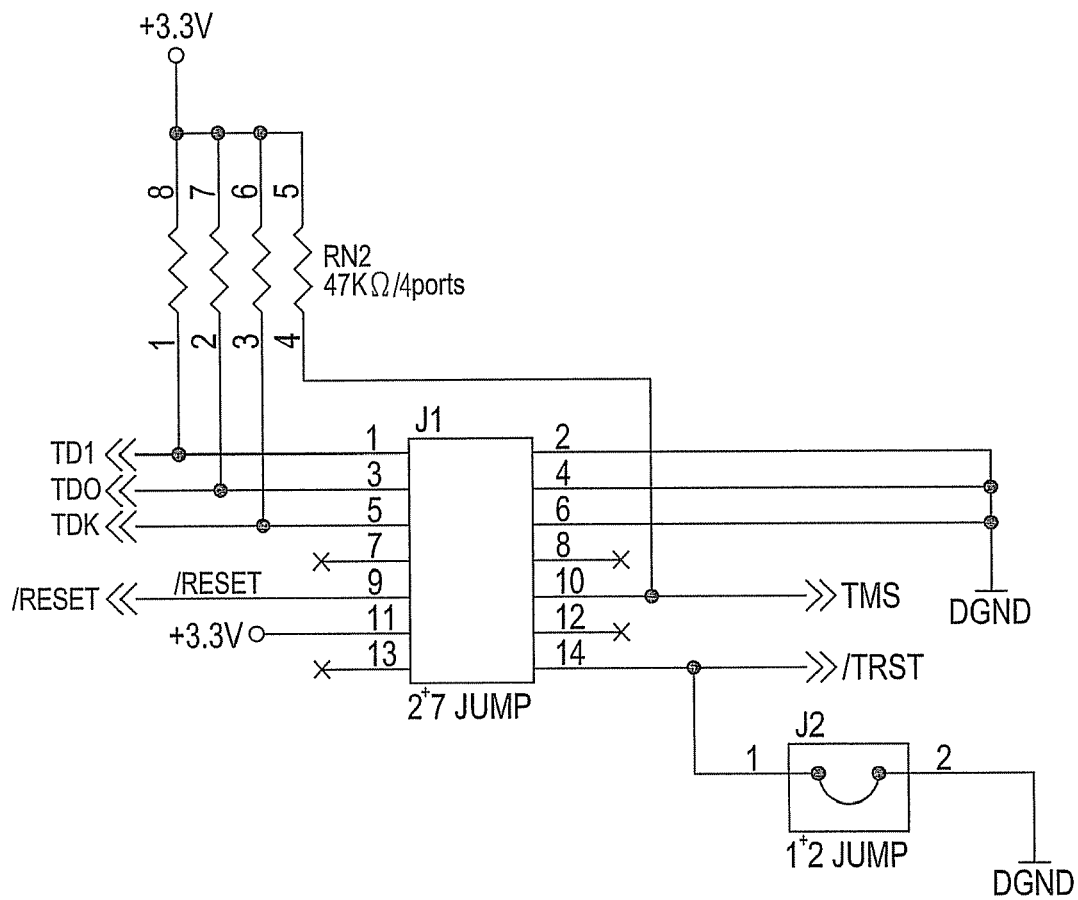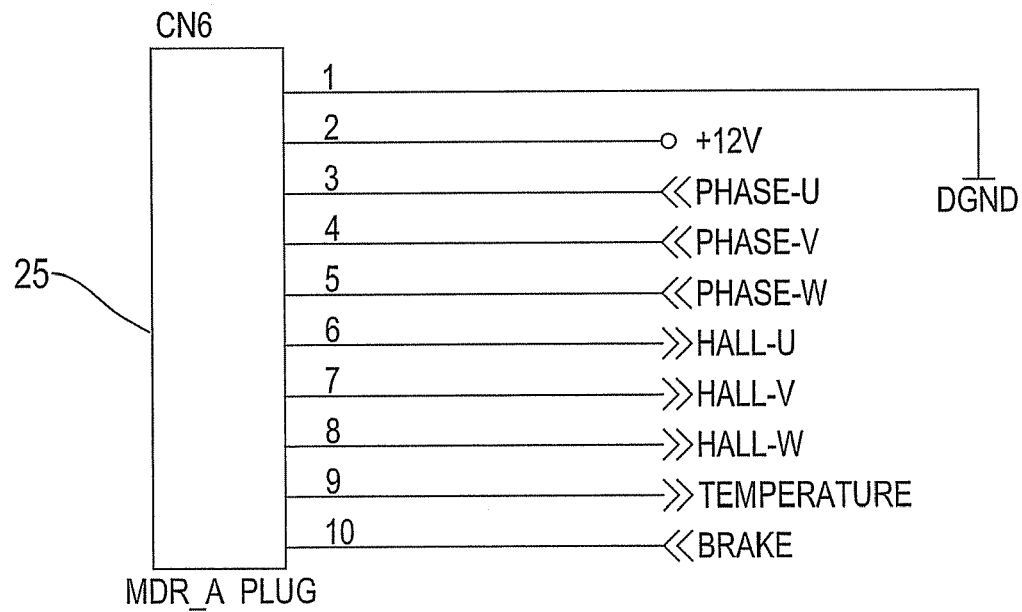
FIG.3L

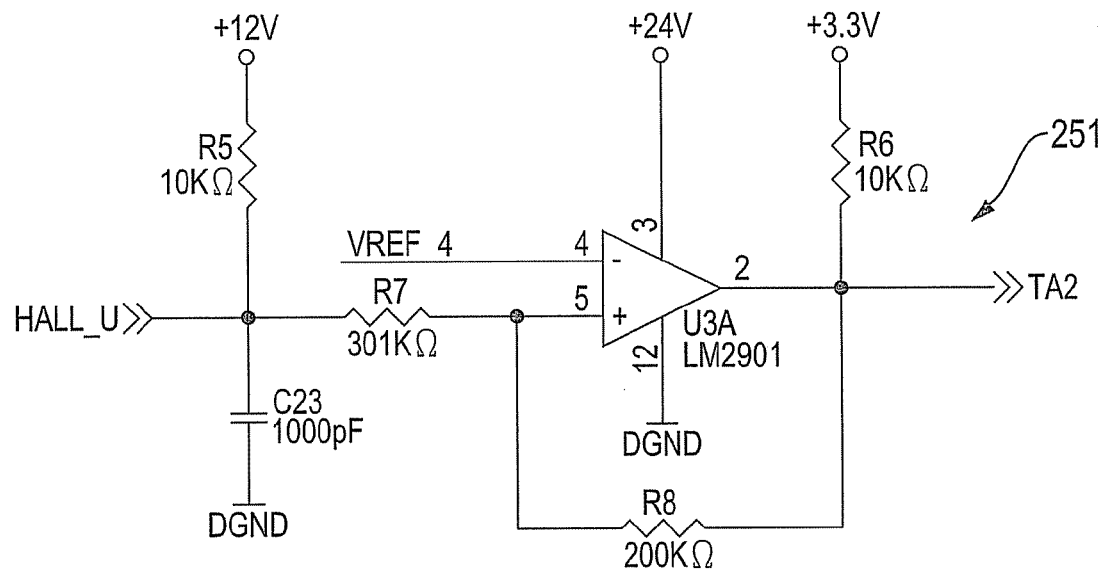
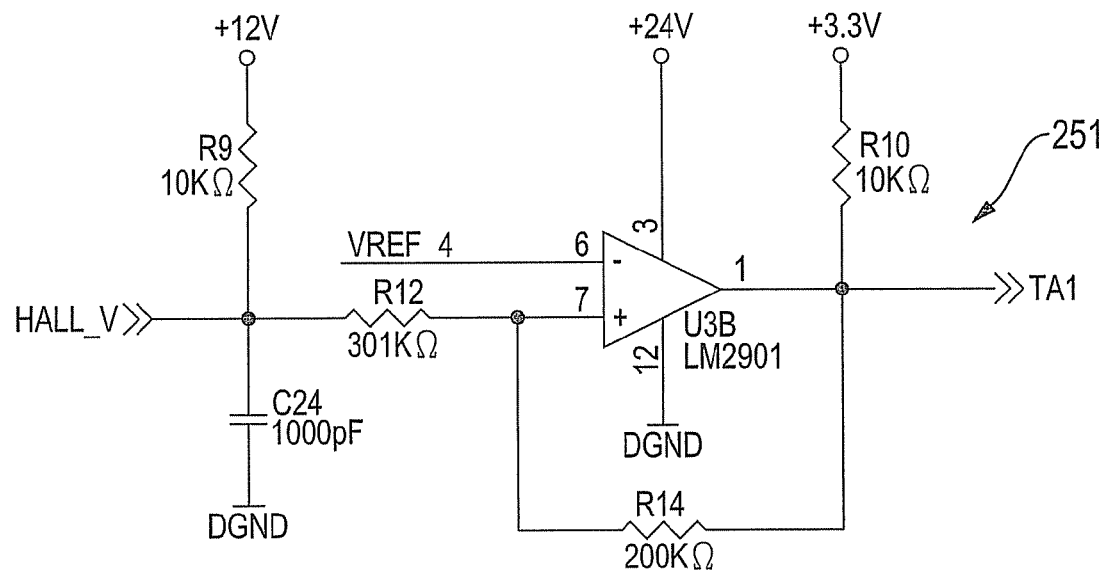
FIG.3M

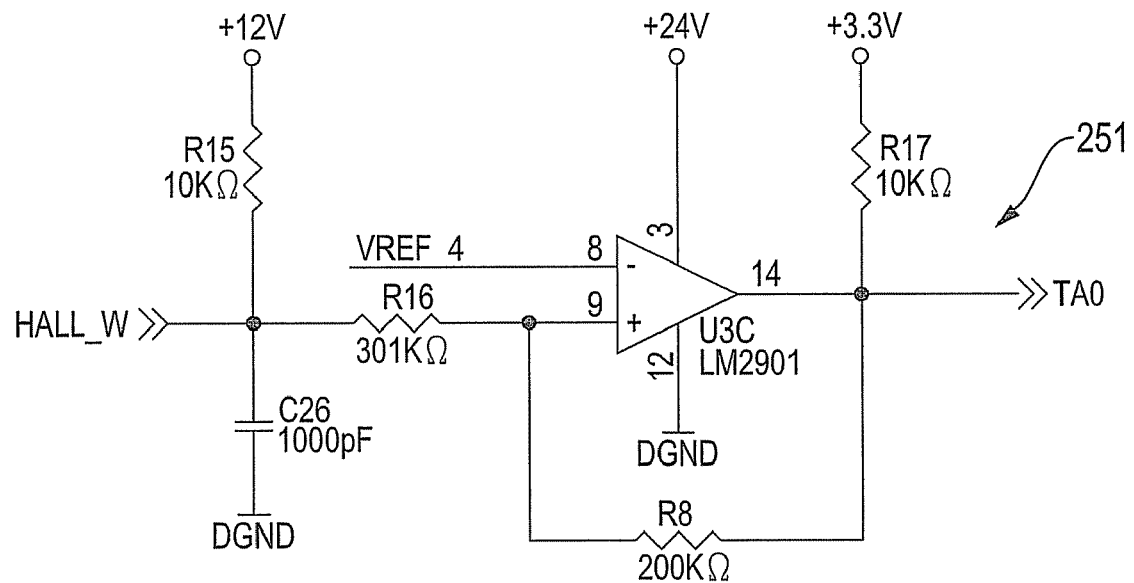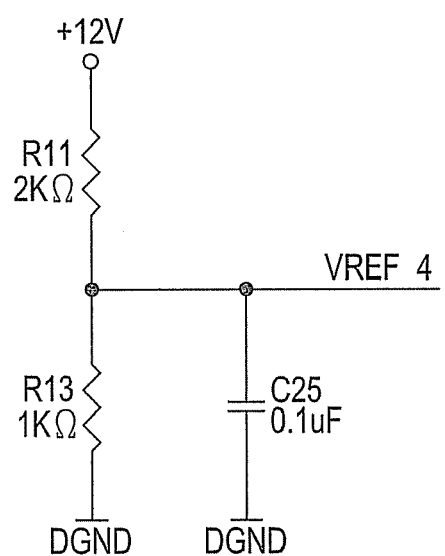
FIG.3N

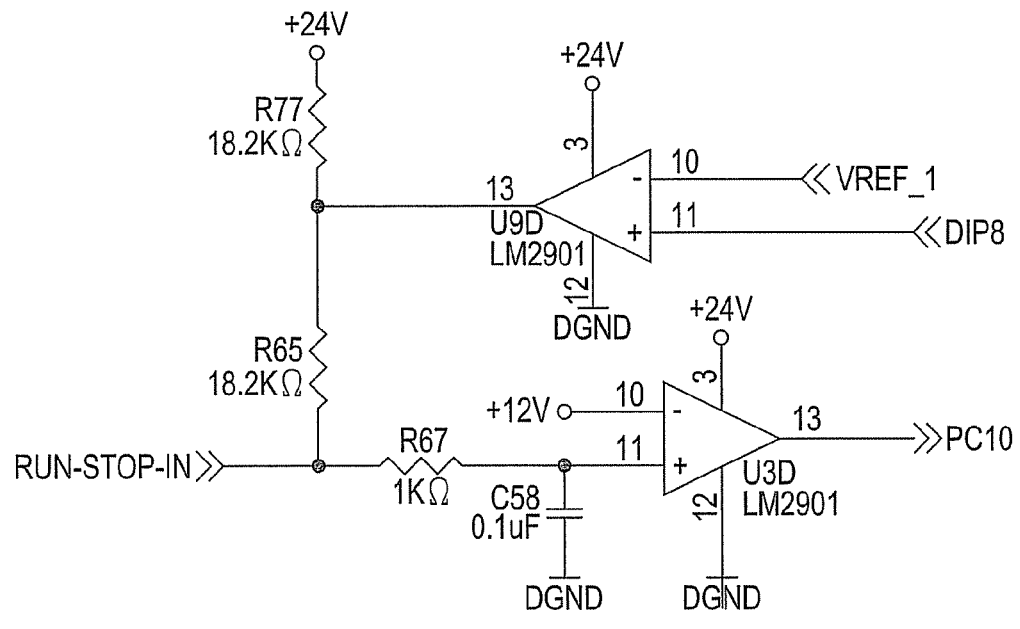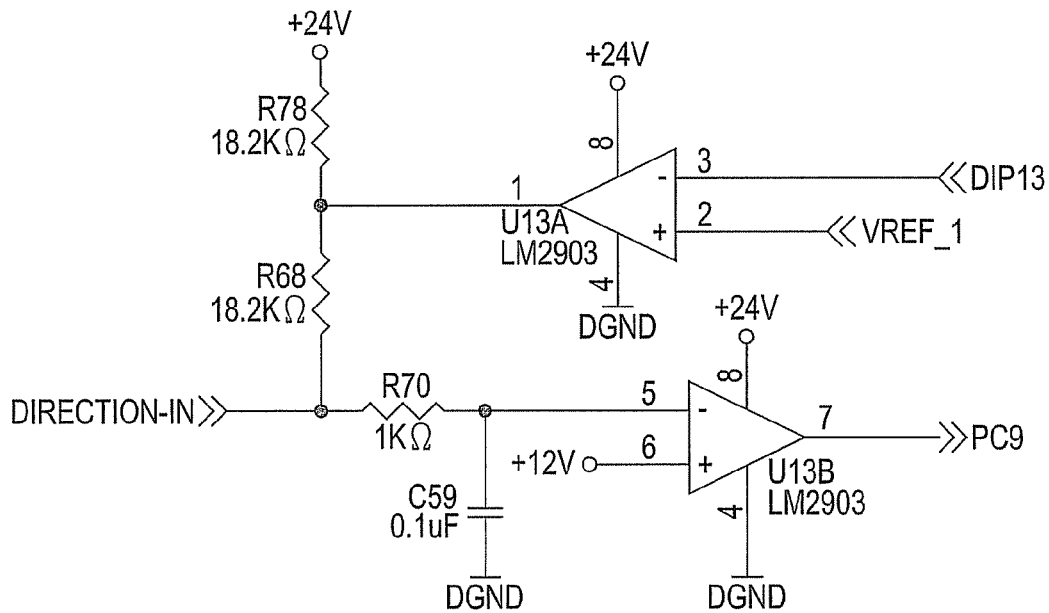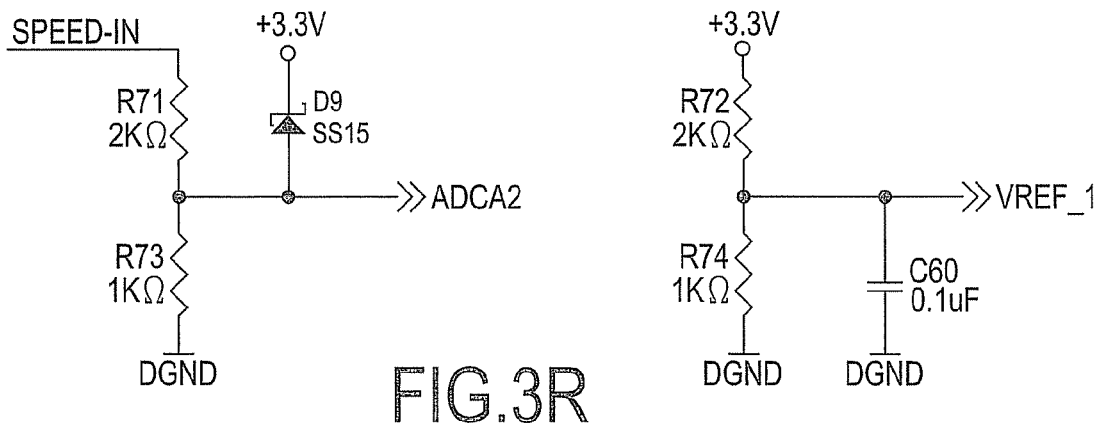
FIG. 3R

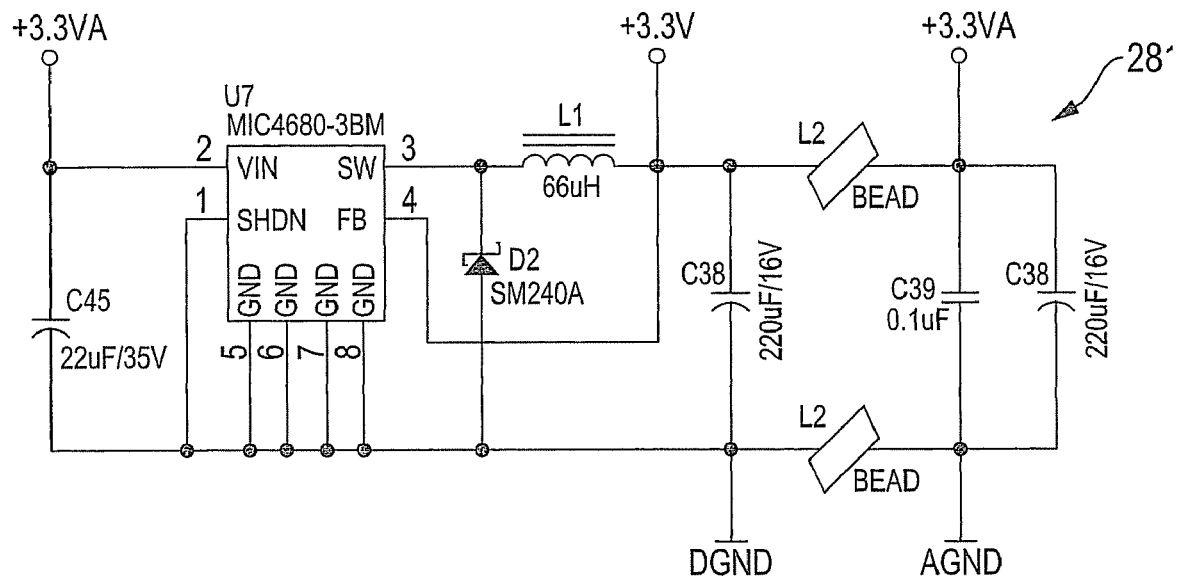
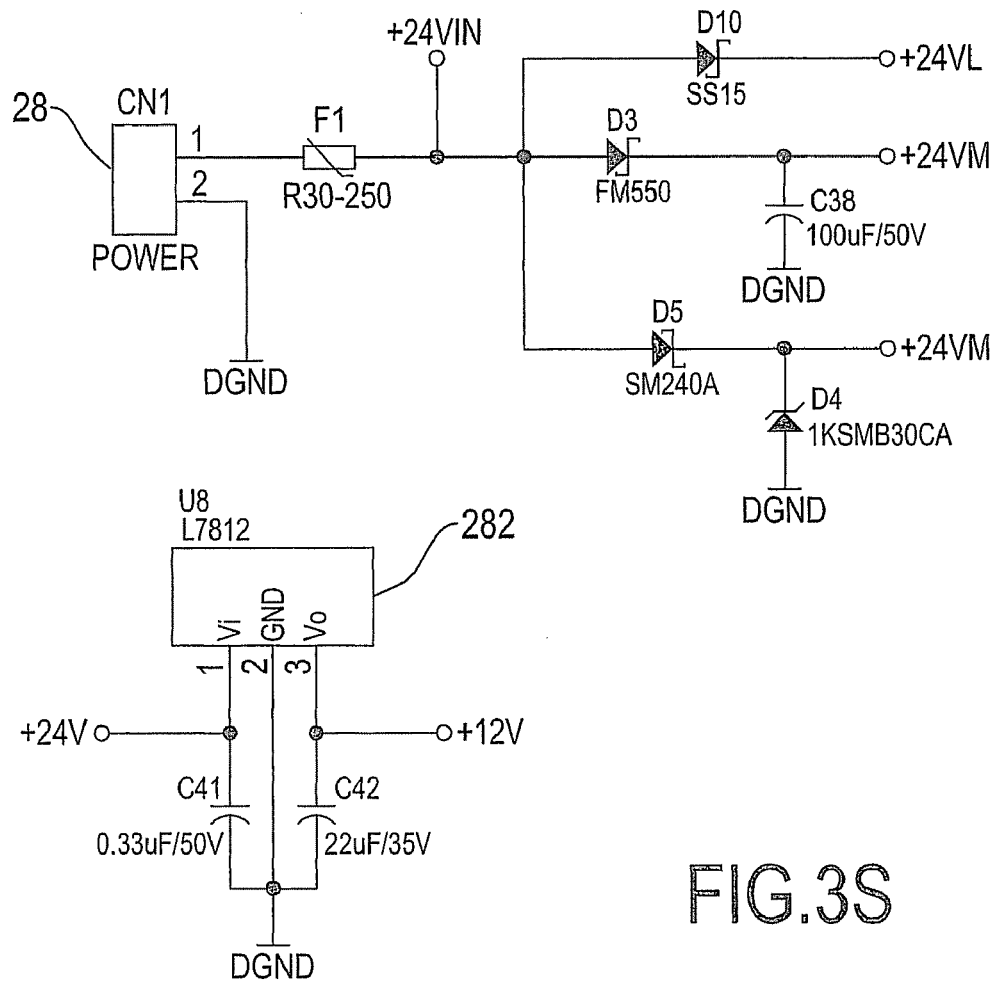
FIG.3S

DRIVE ROLLER CONTROLLER FOR AN ACCUMULATING CONVEYOR SYSTEM

BACKGROUND OF THE INVENTION

1. Field of the Invention

The present invention relates to a drive roller controller for an accumulating conveyor system, and more particularly to a drive roller controller for an accumulating conveyor system that is easily and conveniently combined to the accumulating conveyor system.

2. Description of Related Art

With reference to FIG. 6, a conventional accumulating conveyor system (50) is consisted of multiple accumulating conveyor units (51) and the accumulating conveyor units (51) are connected in serial. Each accumulating conveyor unit (51) has a frame (52), at least one drive roller (60), multiple idler rollers (61) and at least one controller (70).

The drive roller (60) and idler rollers (61) are parallelly and rotatably mounted on the frame (52). The drive roller (60) has a motor (not shown) therein, so the drive roller (60) is driven to rotate relative to the frame (52). Since the adjacent rollers (60, 61) are respectively connected by a belt (63), the idler rollers (61) are driven by the drive roller (60). The controller (70) is mounted outside the frame (52) and electronically connected to the motor of the corresponding drive roller (60). Therefore, the controller (70) controls the motor to rotate the active roller (60) and then the idler rollers (61) are driven by the rotating active roller (60).

When the accumulating conveyor system is constituted by the multiple accumulating conveyor units, the controllers of the accumulating conveyor units are electronically connected. Each controller responses the present status of the corresponding accumulating conveyor unit to other controllers. When goods are now on the first accumulating conveyor unit of the accumulating conveyor system, the first controller obtains the present status of the second controller of the second accumulating conveyor unit. If the first controller determines the status of the second accumulating conveyor unit is normal, the first and second controllers respectively controls the motors of the drive roller controllers to rotate. The goods on the first accumulating conveyor unit will be delivered to the second accumulating conveyor unit. The controllers of the accumulating conveyor system continually repeat the same actions to deliver goods to a specific accumulating conveyor unit or the last accumulating conveyor unit.

In general, one accumulating conveyor unit requires one active roller. However, some accumulating conveyor units are slanted to match the uneven landform and the slanted accumulating conveyor unit requires two or more active rollers to provide large enough force to deliver goods thereon. In this case, an installer has to use different controller to control the motors of the active rollers of the slanted accumulating conveyor unit. Therefore, the accumulating conveyor system installer has to prepare different controllers to consist the accumulating conveyor system, and the installing steps are complex.

With further reference to FIG. 7, the controller has connecting ports to connect to the corresponding connecting port of the adjacent controller. The conventional controller has a casing and the connecting ports are formed on a front face of the casing. When wires are plugged into the connecting ports of the two adjacent connector, the wires are protruded from outside the frame. With reference to FIG. 6, the operators impurposely touch the wires when they are walking or moving the goods on the accumulating conveyor system. Therefore, the wires are easily dropped from the connecting port of the controller.

To overcome the shortcomings, the present invention provides a drive roller controller for accumulating conveyor system to mitigate or obviate the aforementioned problems.

SUMMARY OF THE INVENTION

The main objective of the present invention is to provide a drive roller controller for accumulating conveyor system that is suitable for different accumulating conveyor units of the accumulating conveyor system, so the accumulating conveyor system is easily and conveniently combined by using the drive roller controllers.

The drive roller controller has a casing and a circuit board. The casing has a front face, two opposite sides and multiple openings respectively defined on the front face and the opposite sides. The circuit board is mounted inside the casing and has a controlling unit having a processor, a three-phase inverter, a first and second communicating ports, a motor connecting port, a photo sensor connecting port, an input device and an power source port. The first and second communicating ports are respectively mounted inside openings on the opposite sides of the casing. Therefore, when the adjacent two drive roller controllers are connected to communicate each other, a wire is connected between the first and second communicating ports on opposite sides of the two drive roller controllers. The wire is not easily protruded outside the accumulating conveyor unit, so the connection of the wire and the drive roller controller is not easily disconnected. Further, the input device is mounted on the front face of the casing and electronically connected to the processor to set parameters of a motor and control operation of the motor. The same drive roller controllers drives the drive rollers on the slanted accumulating conveyor unit or general accumulating conveyor unit, so installing steps and period are decreased.

The second objective of the present invention is to provide the drive roller controller having a capability of monitoring signal.

The third objective of the present invention is to provide the driver roller controller having a capability of detecting and alarming over-temperature.

Other objectives, advantages and novel features of the invention will become more apparent from the following detailed description when taken in conjunction with the accompanying drawings.

DETAILED DESCRIPTION OF THE INVENTION

Figure 1:
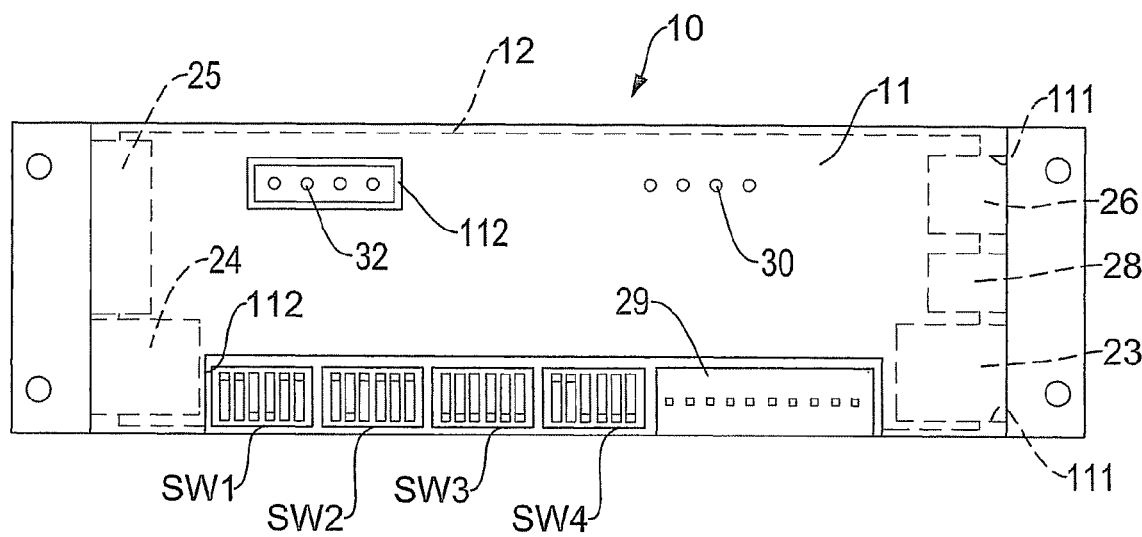
FIG. 1 is top view of a drive roller controller in accordance with the present invention.
Figure 2A:
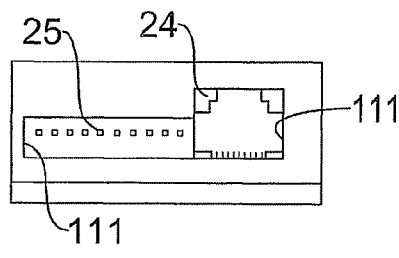
FIG. 2A is a right view of the drive roller controller in accordance with the present invention.
Figure 2B:
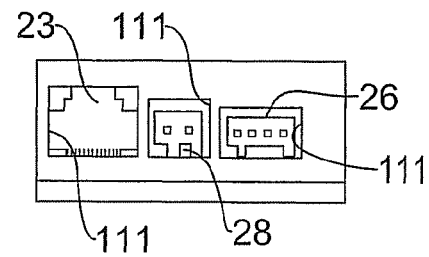
FIG. 2B is a left view of the drive roller controller in accordance with the present invention.

With reference to FIGS. 1, 2A, 2B and 4, the drive roller controller (10) has a casing (11) and a circuit board (12).

The casing (11) has a front face, two opposite sides and multiple openings (111, 112) respectively defined on the front face and the opposite sides.

The circuit board (12) is mounted inside the casing (11) and has a controlling unit (20). The controlling unit (20) has a processor (21), a three-phase inverter (22), a first and second communicating ports (23, 24), a motor connecting port (25), a photo sensor connecting port (26), an input device (27), an power source port (28), an auxiliary connecting port (29), an indicator (30), a temperature sensor (31) and a serial input and output port (32).

The first and second communicating ports (23, 24) are respectively mounted inside openings (111) on the opposite sides of the casing (11). The motor connecting port (25), the photo sensor connecting port (26) and the power source port (28) are exposed outside of the casing (11). The input device (27), the auxiliary connecting port (29), an indicator (30) and serial input and output port (32) are mounted inside the openings (112) of the front face of the casing (11).

The power source port (28) is used to power line with power source. The motor connecting port (25) is electronically connected to wires of a three-phase DC brushless motor (40) including three current wires (Iu, Iv, Iw), a motor temperature signal wire ($T_M$) and three hall singal wires (Hu, Hv, Hw).

Figure 3A:
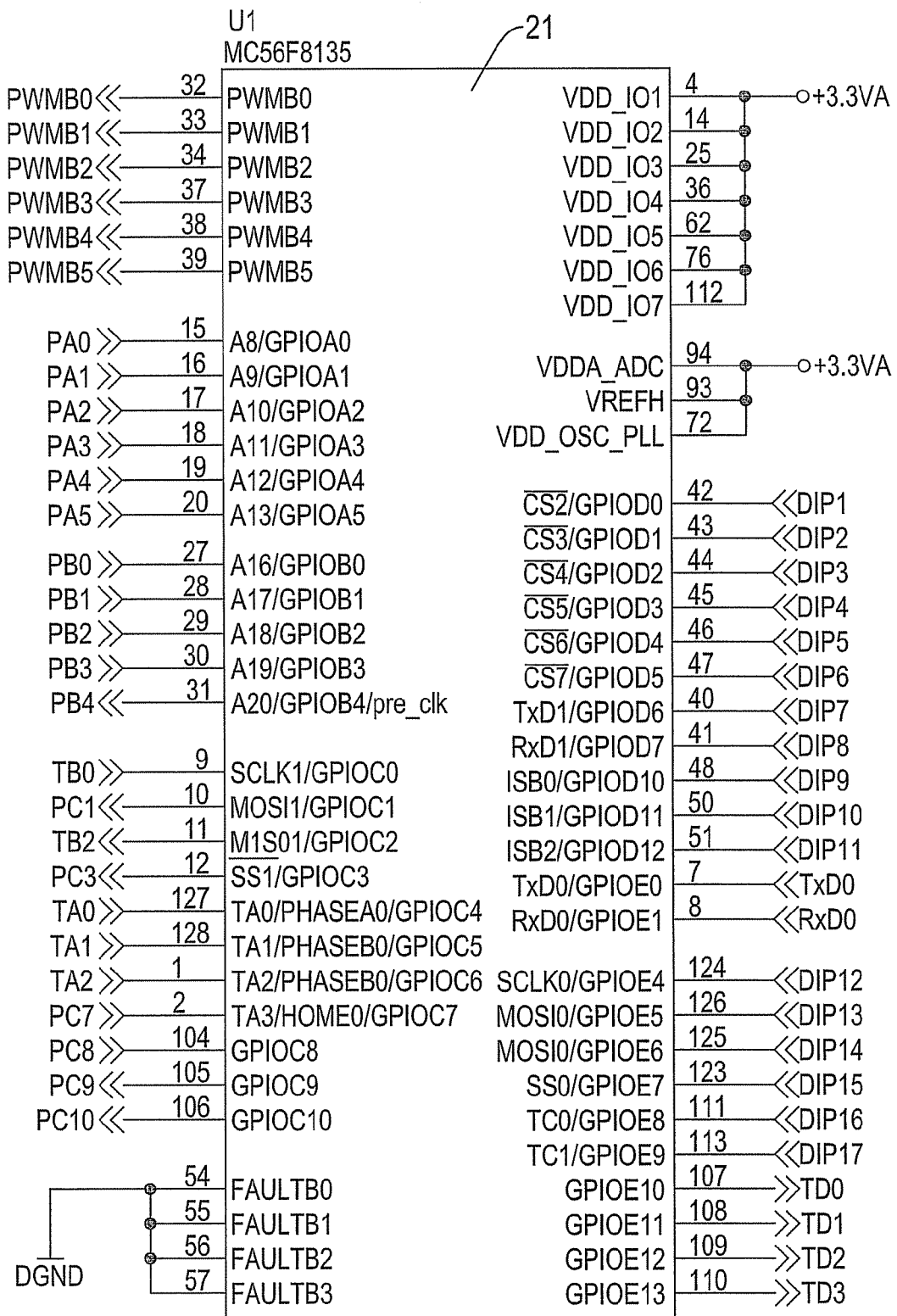
FIGS. 3A to 3T are parts of a detailed circuit diagram of the drive roller controller in accordance with the present invention.
Figure 3B:
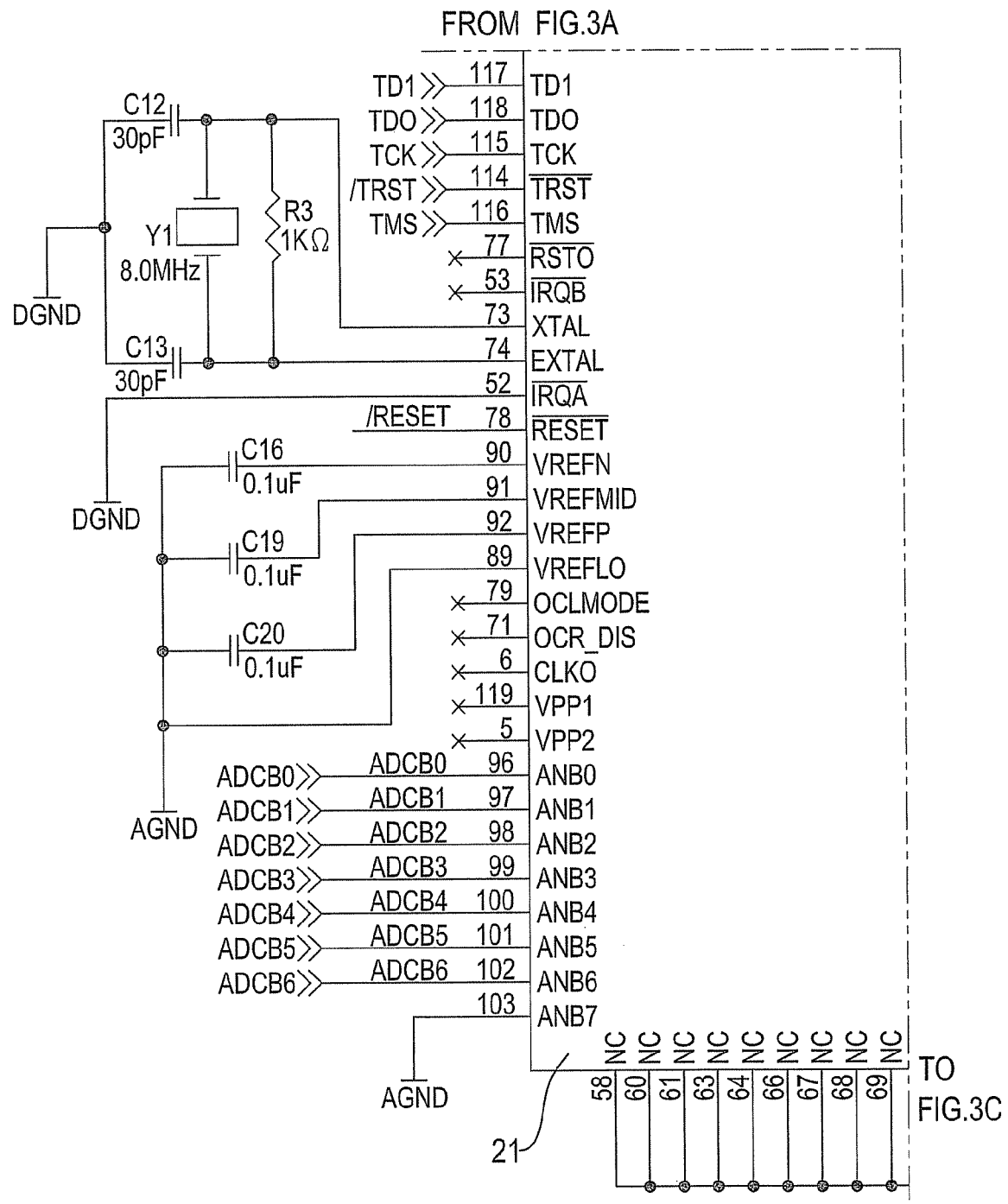
Figure 3C:
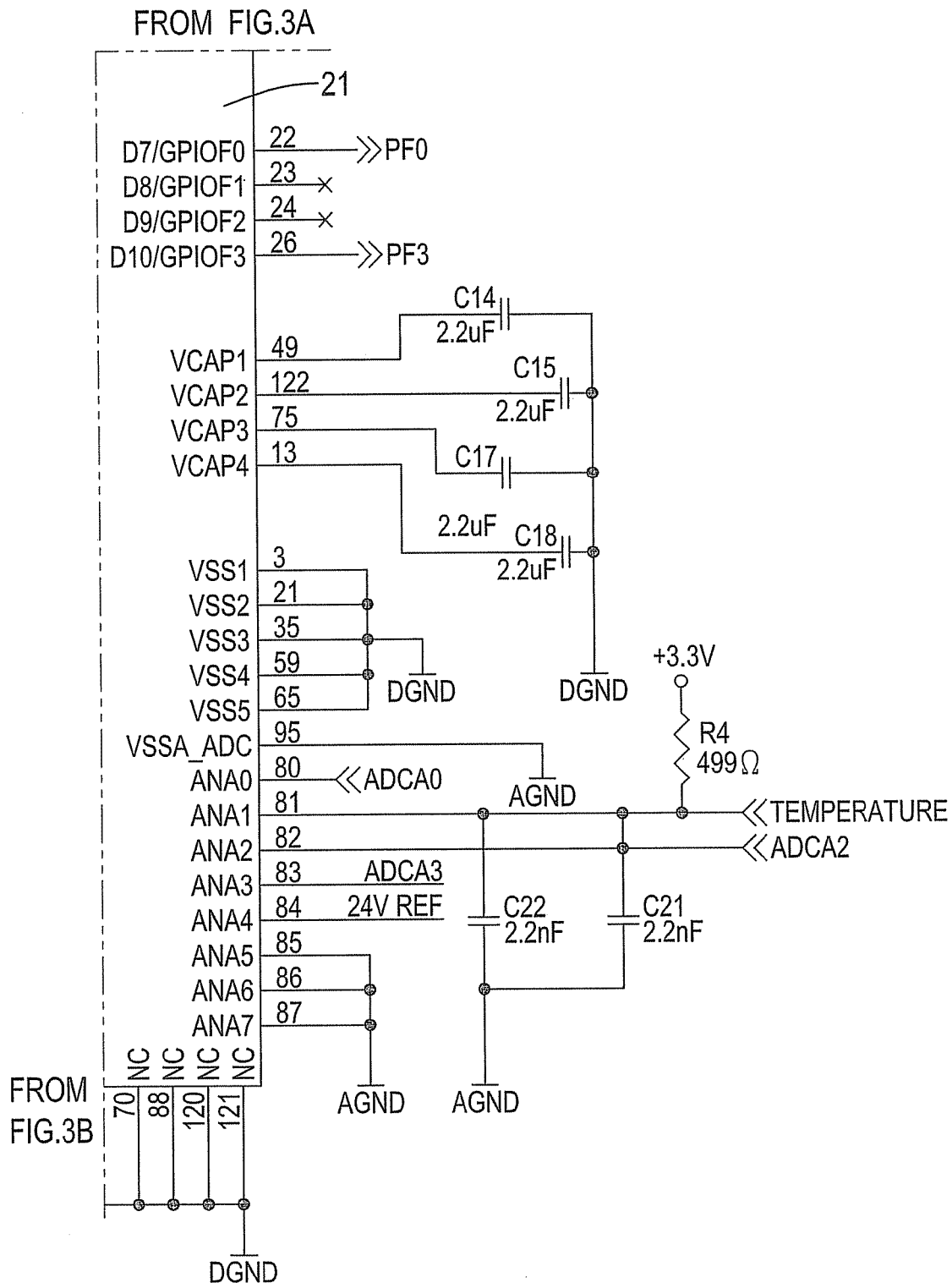

With further reference to FIGS. 3A to 3R, a detailed circuit diagram of the controlling unit is shown. With first reference to FIGS. 3A to 3D, the processor (21) uses a MC56F8135 IC to implement and has a signal processing and pulse width modulating unit (211), an analog to digital converter (212), an inverting time sequence signal generating unit (213) and a general purpose input and output interface (214).

The signal processing and pulse width modulating unit (211) is electronically connected to the three-phase inverter (22). The three-phase inverter (22) is electronically connected to the three current wires (Iu, Iv, Iw) of the motor (40) through the motor connecting port (25).

The analog to digital converter (212) is electronically connected to the temperature sensor (31), the power source port (28), the motor temperature signal wire ($T_M$) of the motor (40) through the motor connecting port (25) and the signal processing and pulse width modulating unit (211). The signal processing and pulse width modulating unit (211) obtains a present temperature values inside of the casing (11) and the motor (40) and a present voltage of a power source through the analog to digital converter (212).

The inverting time sequence signal generating unit (213) is electronically connected to the hall signal wires (Hu, Hv, Hw) of the motor (40) through the motor connecting port (25) and the signal processing and pulse width modulating unit (211). The inverting time sequence signal generating unit (213) generates and outputs inverting time sequence signals according to the hall signals from the motor (40).

The general purpose input and output interface (214) is electronically connected to the signal processing and pulse width modulating unit (211), the first and second communicating ports (23, 24), the photo sensor connecting port (26), the input device (27), the auxiliary connecting port (29) and the indicator (30).

The serial input and output interface (32) is electronically connected to the signal processing and pulse width modulating unit (211) and the auxiliary connecting port (29). The serial input and output interface (32) may be an RS-232 port or USB port.

The signal processing and pulse width modulating unit (211) obtains the present temperature values inside of the casing (11) and the motor (40) and a present voltage of a power source through the analog to digital converter (212). Therefore, the signal processing and pulse width modulating unit (211) determines whether an over-temperature status, an over-current status or an over-voltage status is occurred. If any status as mentioned above is occurred, the signal processing and pulse width modulating unit (211) drives the indicator (30) to alarm an operator through the general purpose input and output interface (214).

With further reference to FIGS. 3E and 3F, the three-phase inverter (22) has a full-bridge switching circuit (221), a first switch driver (222) and a second switch driver (223).

The full-bridge switching circuit (221) has three upper-arm switches (Q2, Q4, Q6) and three lower-arm switches (Q1, Q3, Q5). Each switch (Q1 to Q6) has a controlling terminal (DA0 to DA5) and may be a MOSFET or IGBT. The three lower-arm switches (Q1, Q3, Q5) are respectively electronically connected to the upper-arm switches (Q2, Q4, Q6) in serial. The three serial nodes of the upper-arm switches (Q2, Q4, Q6) and the lower-arm switches (Q1, Q3, Q5) are further electronically connected to three current input terminals (PHASE_U, PHASE_V, PHASE_W) of the motor connecting port (25).

The first switch driver (222) is electronically connected to the controlling terminals (DA0, DA2, DA4) of the upper-arm switches (Q2, Q4, Q6) and three PWM outputs (PWM0, PWM2, PWM4) of the signal processing and pulse width modulating unit (211) of the processor (21). The signal processing and pulse width modulating unit (211) turns the upper-arm switches (Q2, Q4, Q6) on and off. The signal processing and pulse width modulating unit (211) also controls a conductive time of each upper-arm switch (Q2, Q4, Q6) through the first switch driver (222) according to the inverting time sequence signals from the inverting time sequence signal generating unit (213). The first second switch driver may be a MIC2981 IC.

The second switch driver (223) is electronically connected to the controlling terminals (DA1, DA3, DA5) of the lower-arm switches (Q1, Q3, Q5) and three PWM outputs (PWM1, PWM3, PWM4) of the signal processing and pulse width modulating unit (211). The signal processing and pulse width modulating unit (211) turns the lower-arm switches (Q1, Q3, Q5) on and off. The signal processing and pulse width modulating unit (211) controls a conductive time of each lower-arm switch (Q1, Q3, Q5) through the second switch driver (223) according to the inverting time sequence signals from the inverting time sequence signal generating unit (213). The second switch driver may be a TD310 IC.

The full-bridge switching circuit (221) is further serially and electronically connected to a resistor (R23). With further reference to FIG. 3G, the resistor (R23) is electronically connected to the analog to digital converter (212) of the processor (21) through a signal amplifier (224). Therefore, the signal processing and pulse width modulating unit (211) of the processor (21) determines whether the over-current status or the over-voltage status is occurred.

Figure 3H:
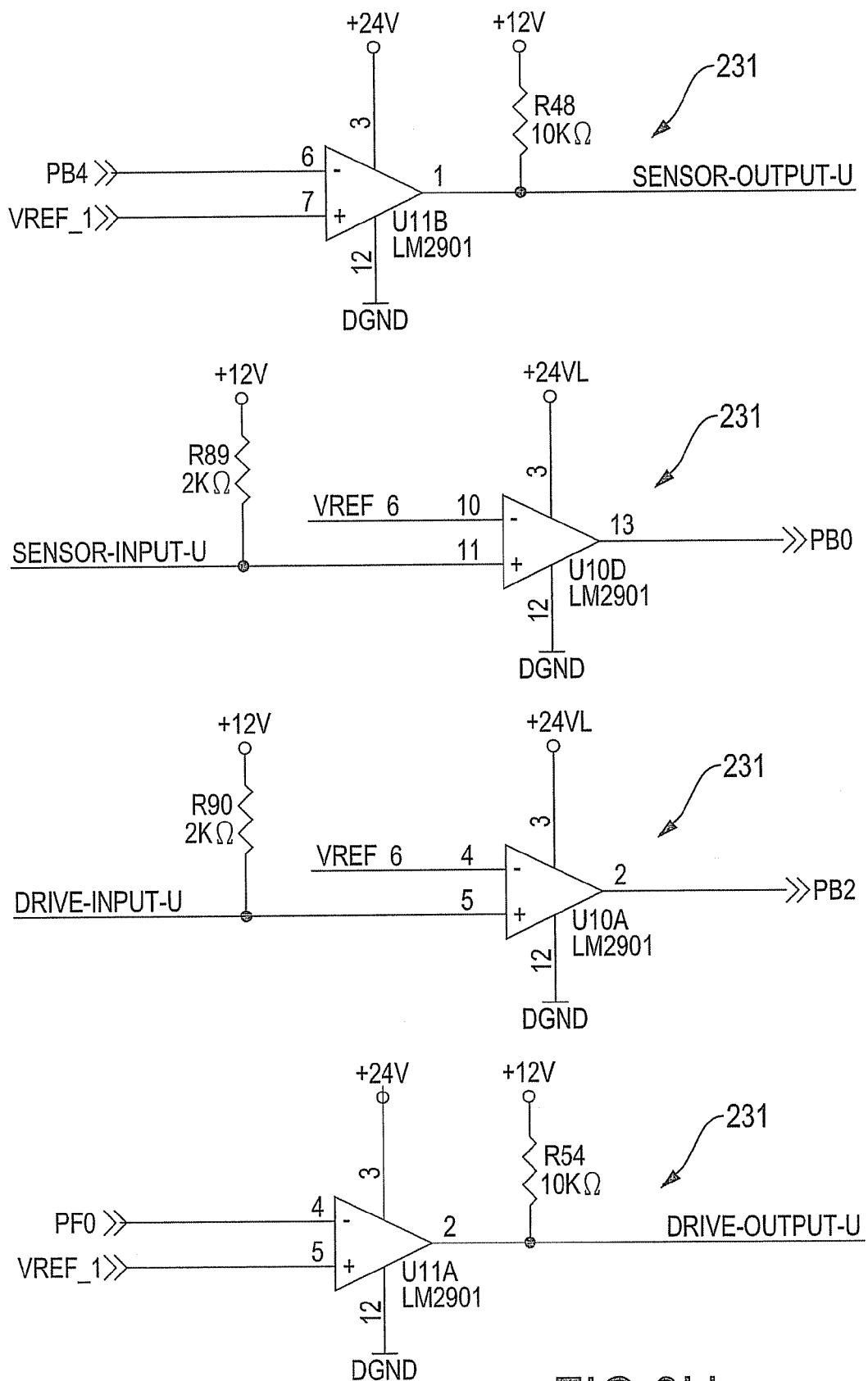
Figure 3I:
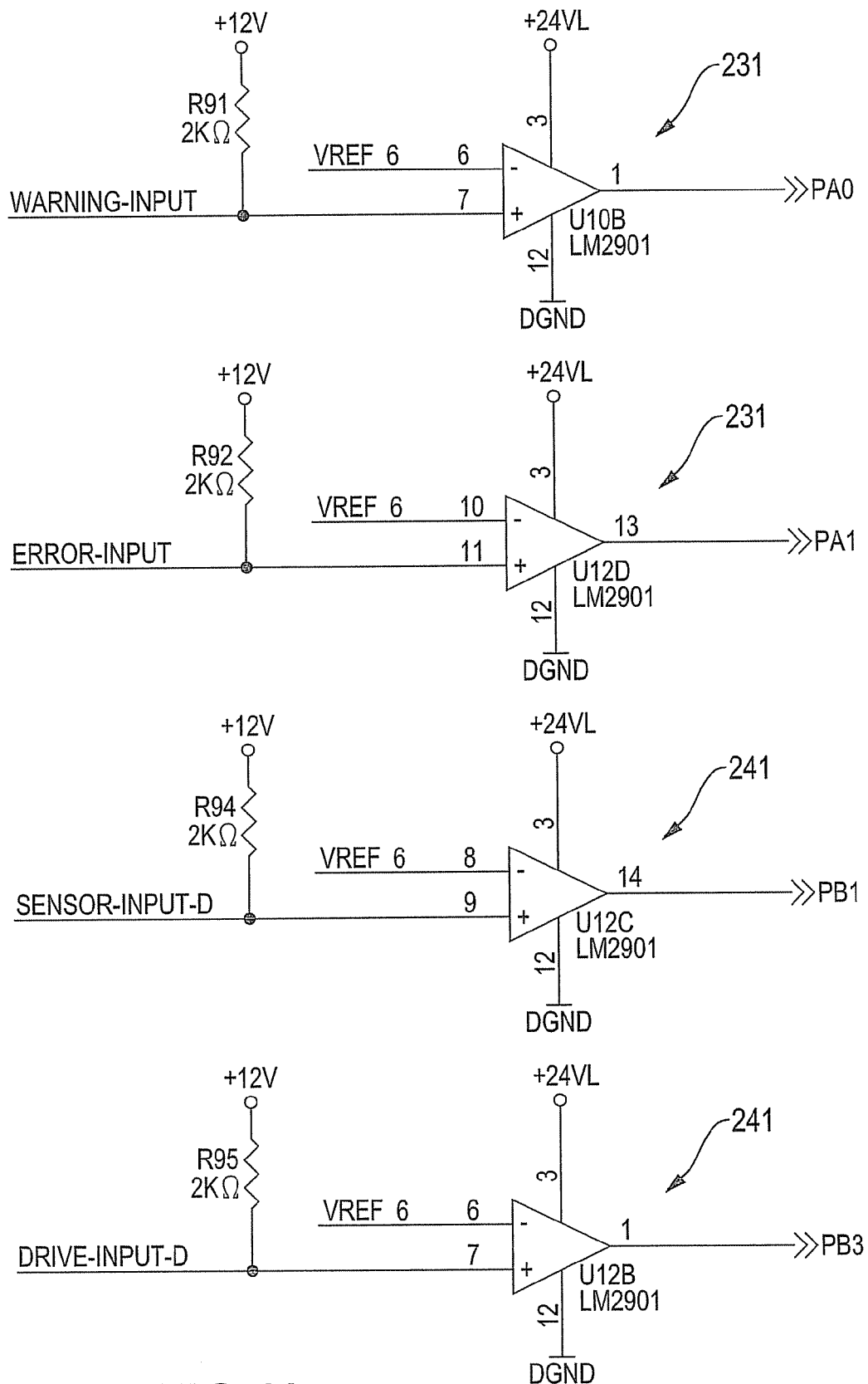
Figure 3J:
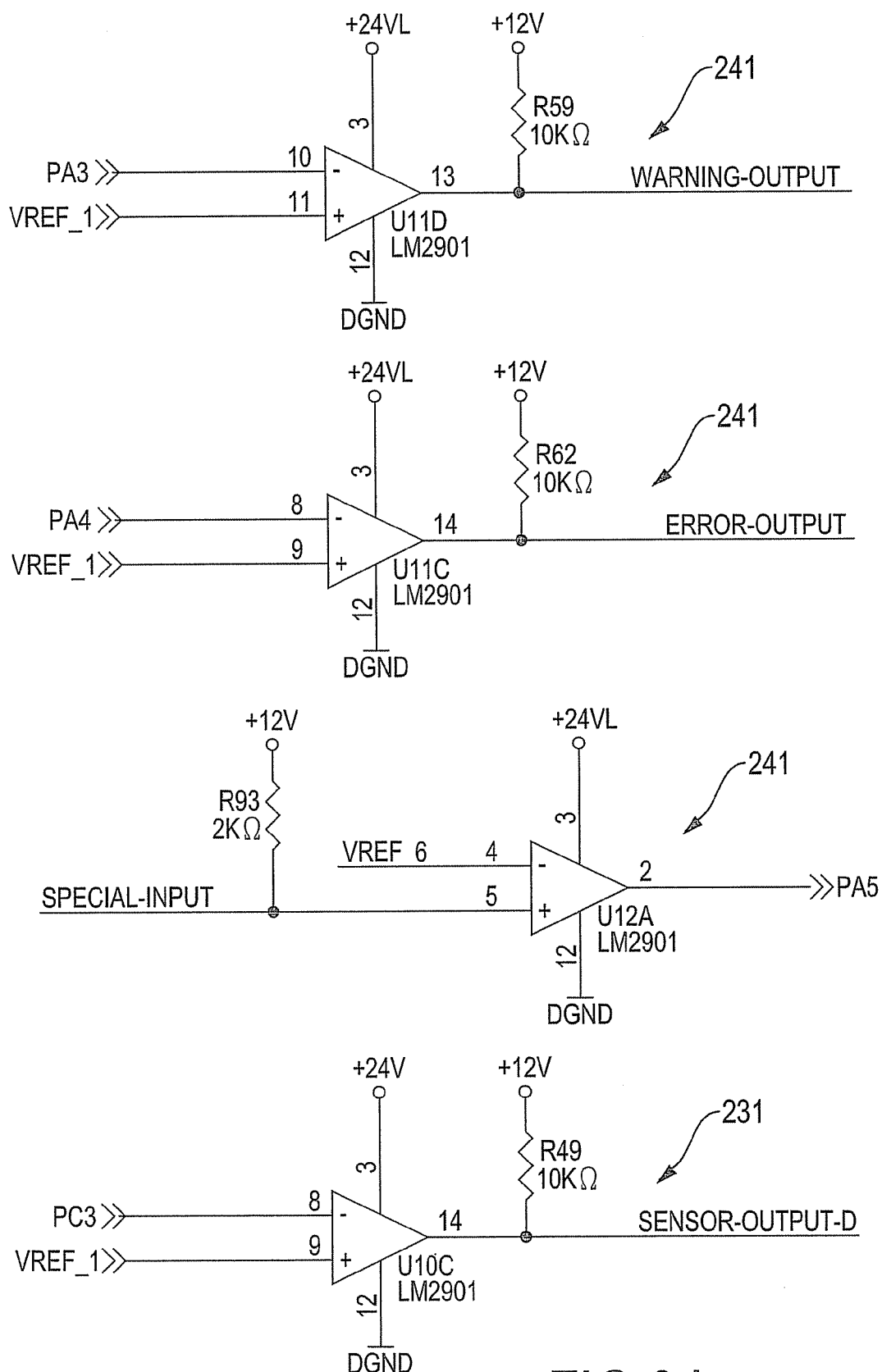
Figure 3K:
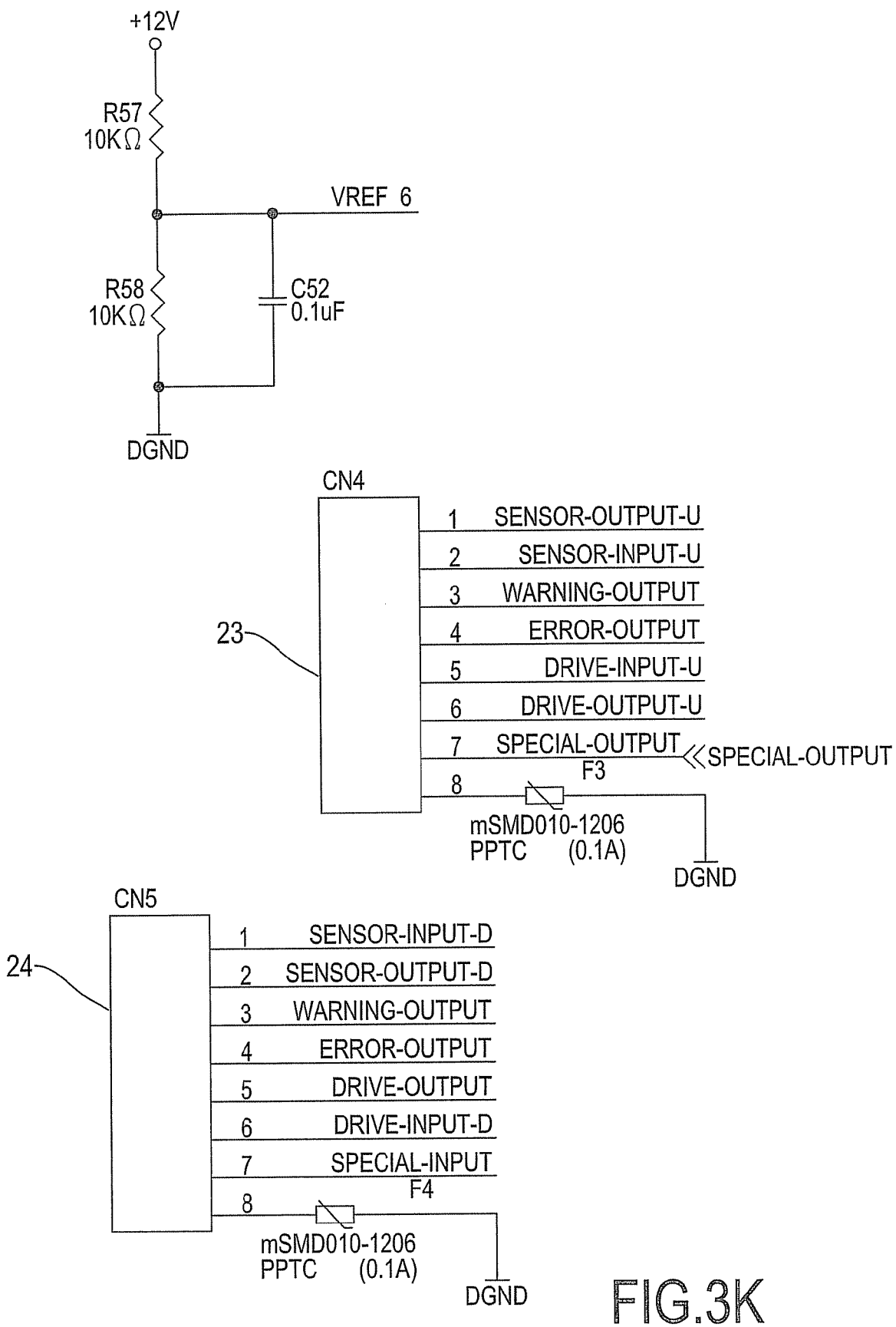
Figure 30:
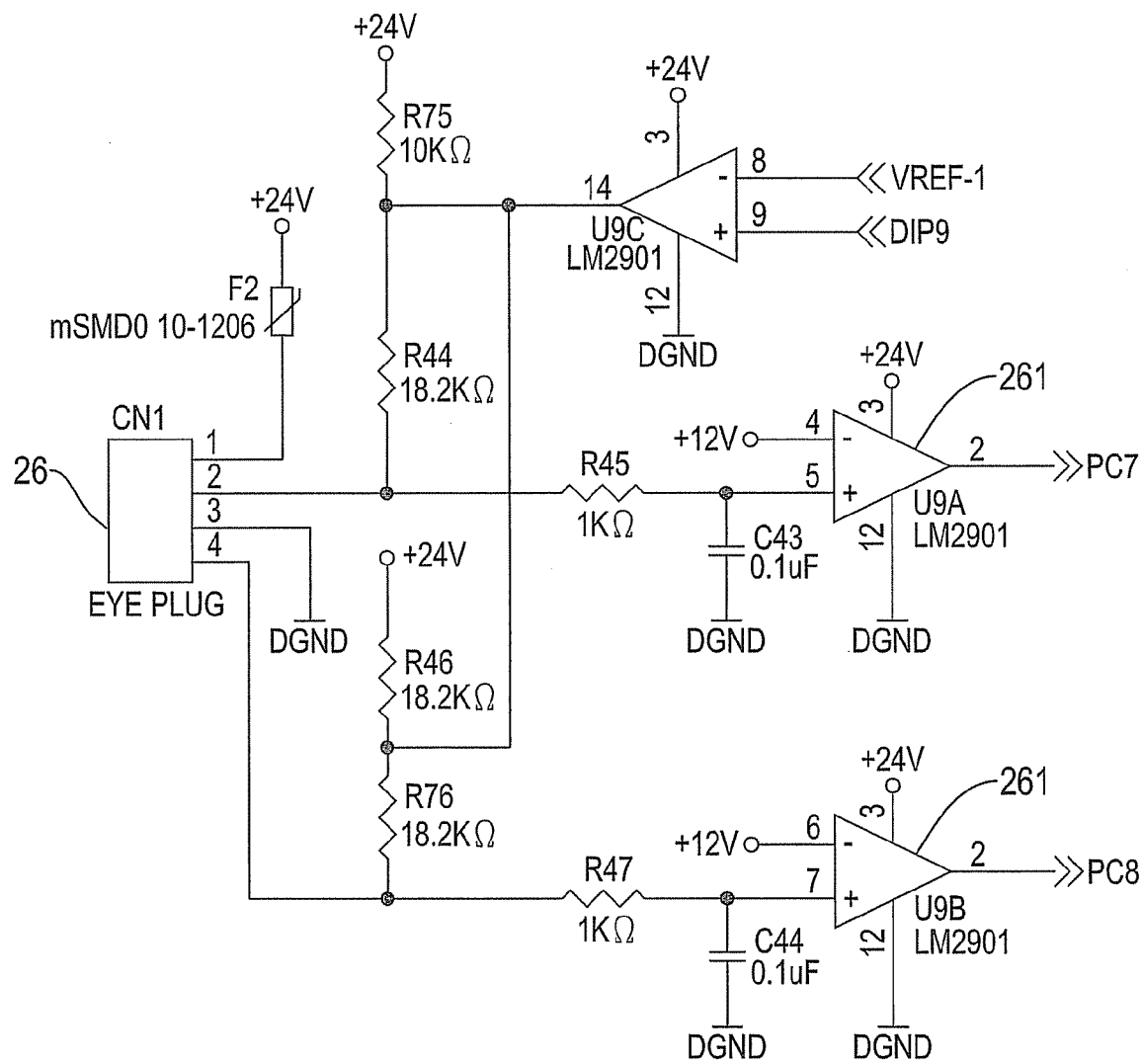

With reference to FIGS. 3H to 3J, the first and second communicating ports (23, 24) may be RJ-45 ports. Since the drive roller controllers (10) are connected in serial, so the first communicating port (23) is used to electronically connect to a second communicating port of a previous first drive roller controller. The second communicating port (24) is used to connect to a first communicating port of a next drive roller controller. Therefore, the adjacent two drive roller controllers are connected by a RJ-45 wire. In addition, the first and second communicating ports (23, 24) are electronically connected to the general purpose input and output interface (214) of the processor (21).

The first communicating port at least comprises a photo sensor signal output, a photo sensor signal input of a previous first accumulating conveyor unit, an error and abnormal signal input of the previous first accumulating conveyor unit, a motor status signal input of a previous first accumulating conveyor unit, a motor status output and a photo sensor signal output of a previous second accumulating conveyor unit. The second communicating port at least comprises a photo sensor signal input of the next accumulating conveyor unit, a photo sensor signal output, an abnormal alarm signal output, an error and abnormal signal output, a motor status signal output, a motor status signal input of the next accumulating conveyor unit and a previous second photo sensor signal input. Further, to ensure a signal from each input or output is correct, each of the inputs and outputs of the first and second communicating ports (23, 24) is electronically connected to a comparator (231, 241).

With reference to FIGS. 3L to 3N, the detailed circuits of the motor connecting port (25) are shown except the three current input terminals (PHASE_U, PHASE_V, PHASE_W), the motor connecting port (25) further has three hall signal outputs (HALL_U, HALL_V, HALL_W), a motor temperature signal output (TEMPERATURE) and an electronic braking signal output (BRAKE).

The three current inputs (PHASE_U, PHASE_V; PHASE_W) are used to electronically collect to the current wires (Iu, Iv, Iw) of the motor (40). The three hall signal outputs (HALL_U, HALL_V, HALL_W) are used to electronically connect to hall signal wires (Hu, Hv, Hw). Since the hall signals from the wires (Hu, Hv, Hw) are input to the inverting time sequence signal generating unit (213) of the processor (21), each of the hall signal outputs (HALL_U, HALL_V, HALL_W) are further connected to one signal amplifier (251). The motor temperature signal output (TEMPERATURE) is used to electronically connect to the motor temperature signal wire ($T_M$).

With reference to FIG. 3O, a detailed circuit of the photo sensor connecting port (26) is shown and has a power source input, photo sensor status output and a normal or alarm status of the photo sensor output. Further, the normal or alarm status of the photo sensor output is electronically connected to the general purpose input and output interface (214) of the processor (21) through a comparator (261).

Figure 3P:
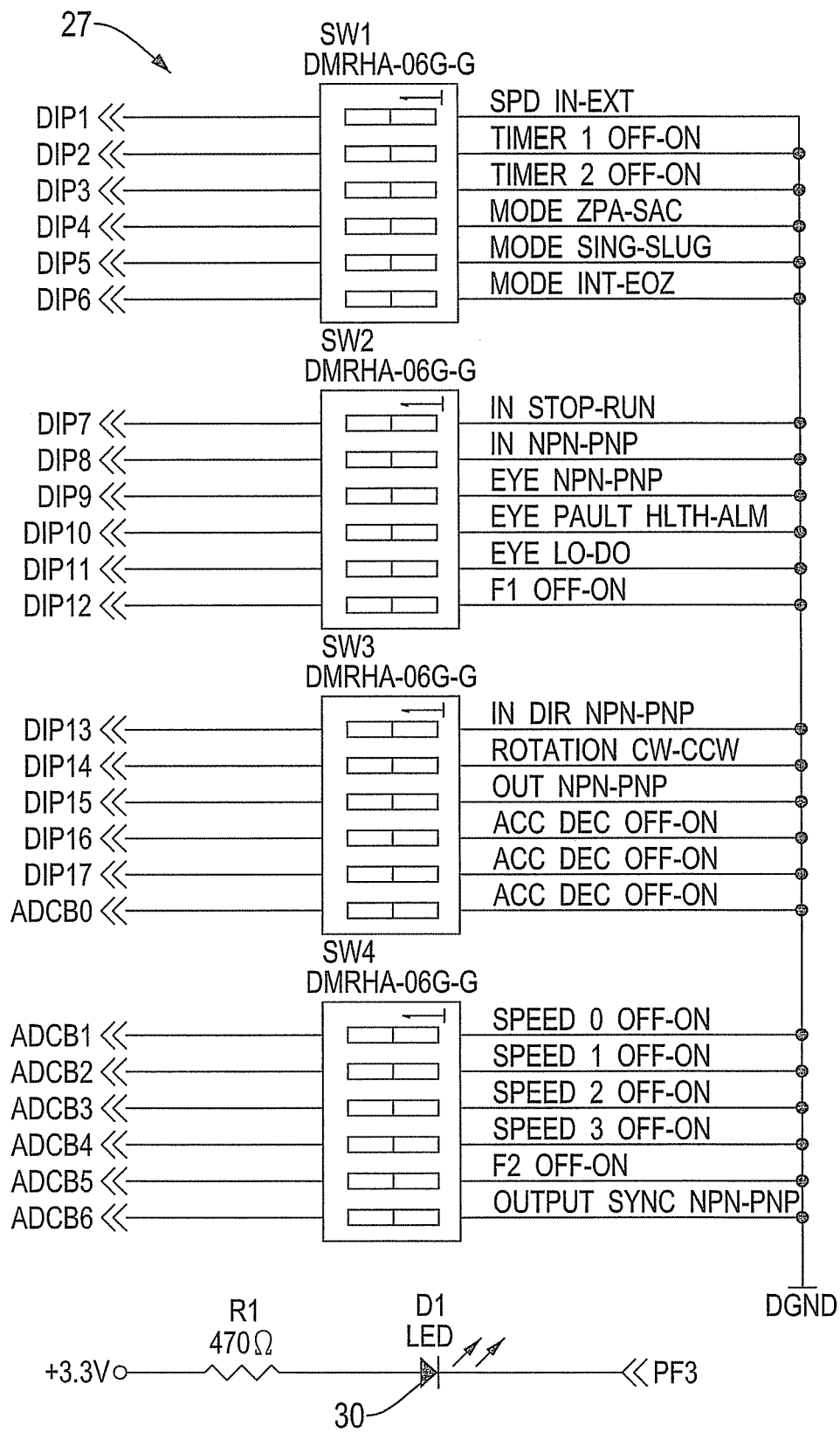

With reference to FIG. 3P, the indicator has at least one LED (L1) and the input device (27) has a first to fourth dip switches (SW1 to SW4) electronically connected to the general purpose input and output interface (214) of the processor (21). The first dip switch (SW1) sets a motor speed and a timer of the processor. The second dip switch (SW2) sets an order of the accumulating conveyor unit, enables to response the normal or alarm status of the photo sensor, sets operating mode of the photo sensor, stops motor rotating. The third dip switch (SW3) sets rotating direction of the motor, increases the speed of the motor and decreases the speed of the motor. The fourth dip switch (SW4) sets a standard torque, a high speed and torque mode and high torque mode.

Figure 3Q:
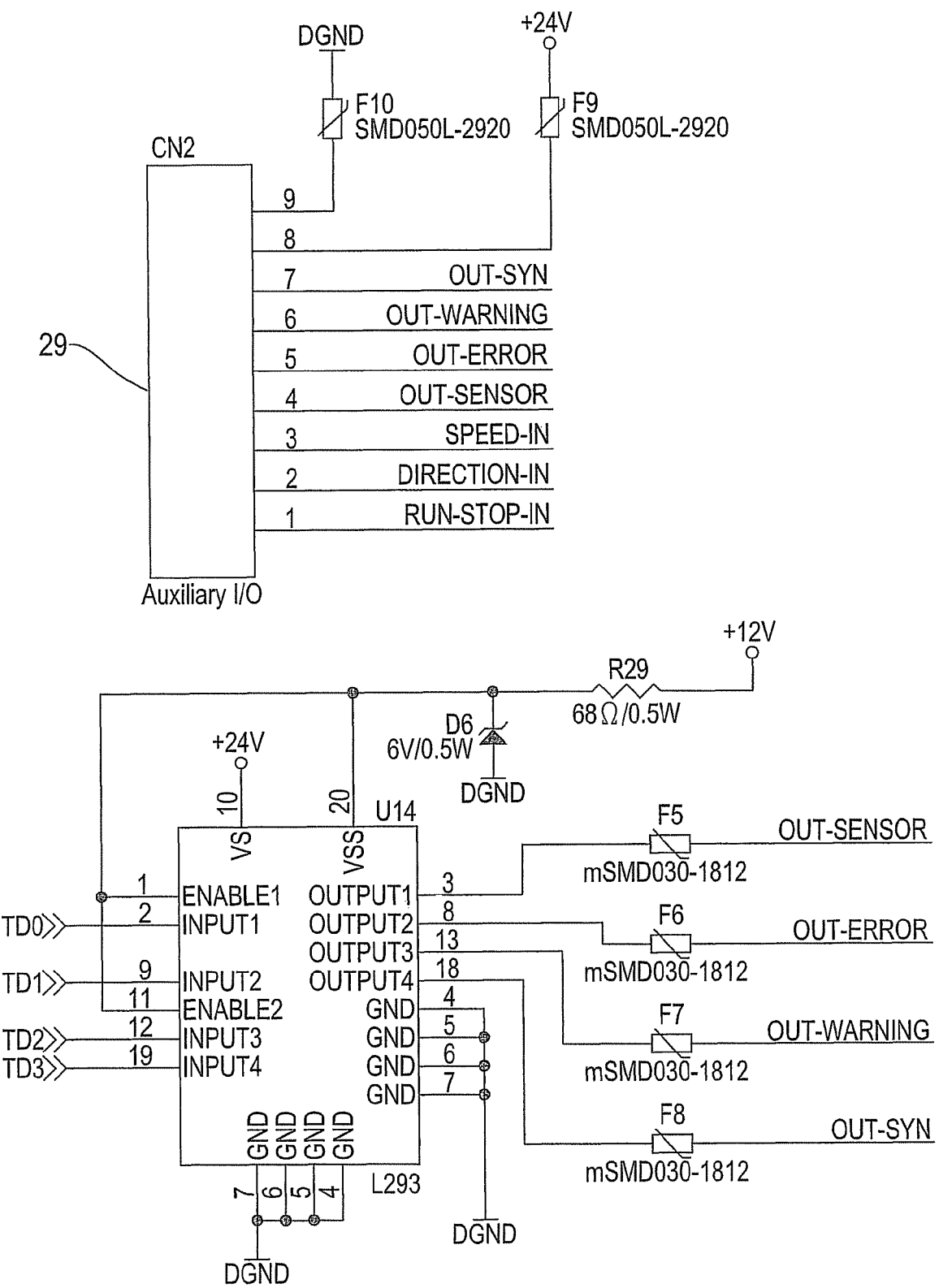

With reference to FIGS. 3Q and 3R, a detailed circuit of the auxiliary connecting port (29) is shown. The auxiliary connecting port (29) is electronically connected to the general purpose input and output interface (214) of the processor (21). The auxiliary connecting port (29) has a rotating direction of the motor and speed controlling terminal, a photo sensor signal output, an error and abnormal output, an abnormal alarm output and a motor status output. Therefore, the operator uses a computer (42) to link to the auxiliary connecting port (29) and the motor status, such as speed, torque, temperature etc., photo sensor signal and the present voltage of power source are shown on the computer (42). In addition, the operator also sends a command of driving motor, stopping motor or changing rotating direction to the drive roller controller through the auxiliary connecting port (29). Therefore, the operator uses computer (42) to monitor and control the operation of the drive roller controller (10).

With reference to FIG. 3S, a detailed circuit of the power connecting port (28) is shown. The power connecting port (28) is further electronically to an external DC power source, a power converter and a voltage regulator. Therefore, the DC power is converted to various voltages (+24V, +12V, +3.3V).

Figure 3T:
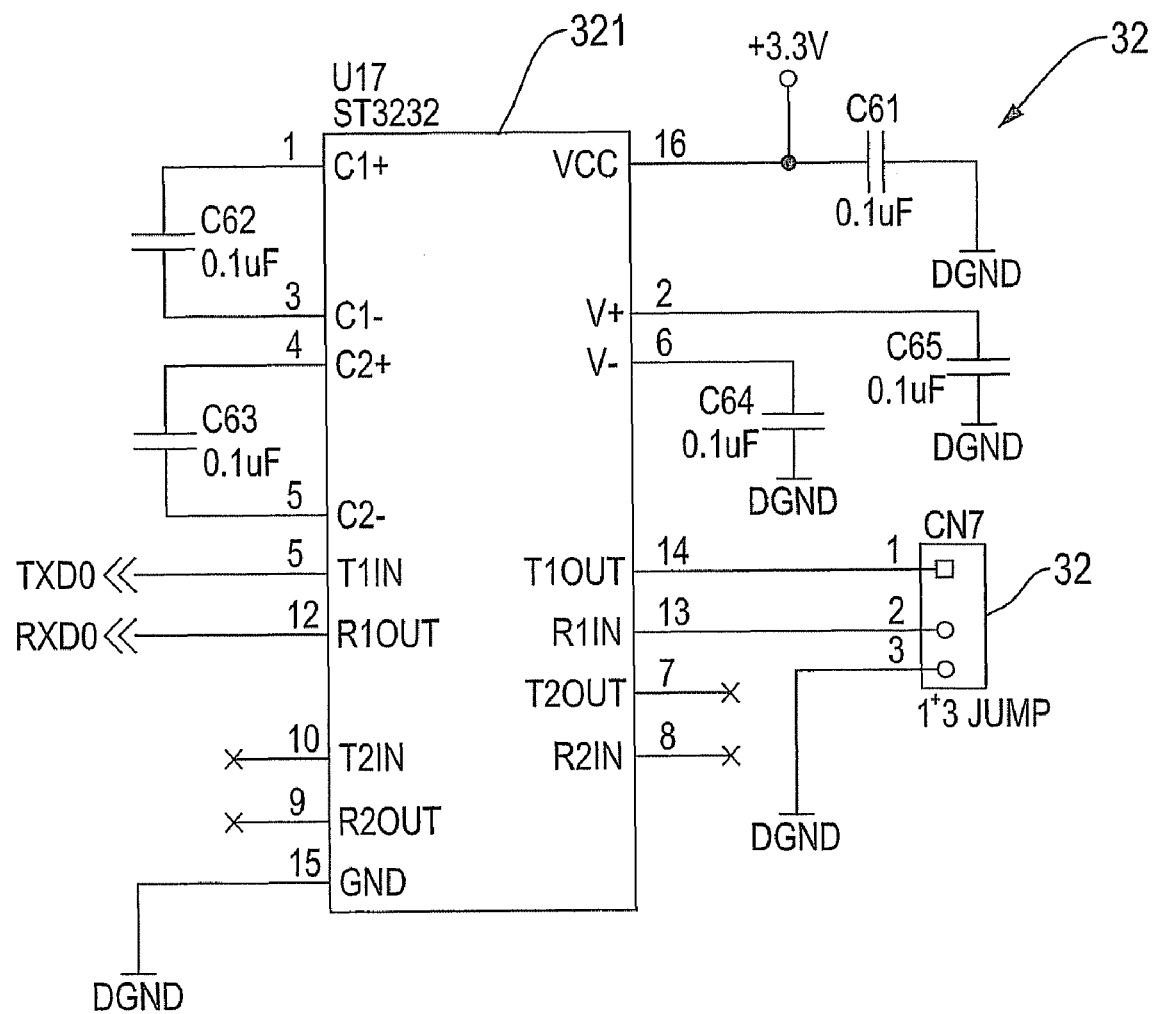
Figure 4:
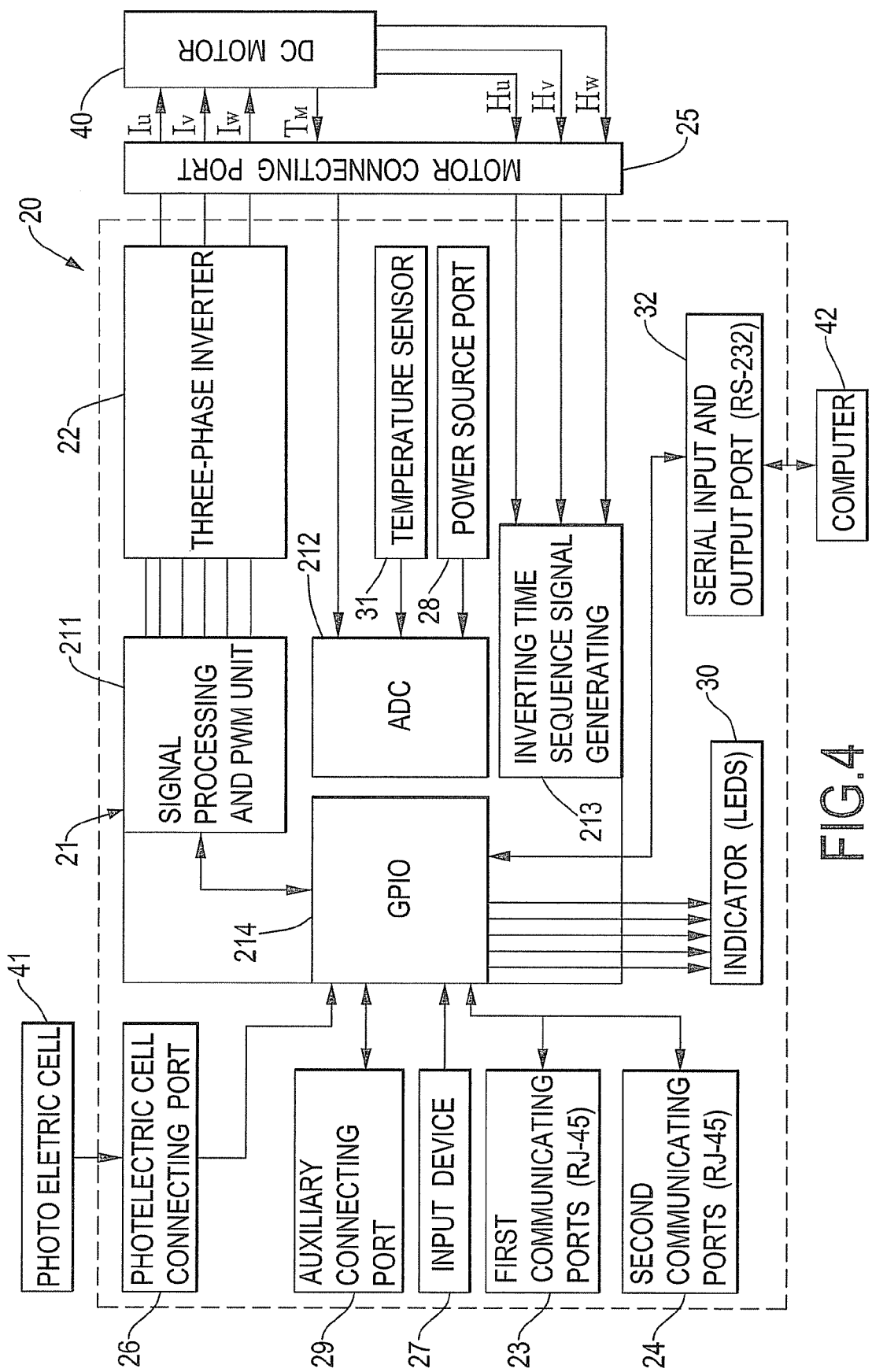
FIG. 4 is a functional block diagram of the drive roller controller in accordance with the present invention.

With reference to FIG. 3T, the serial input and output port (32) is further electronically connected the general purpose input and output interface (214) of 11 the processor (21) through a signal converter (321). The signal converter (321) may be a ST3232 converter and the serial input and output port is an RS-232 port. The serial input and output port (32) is able to connect to the computer (42), and the computer (42) updates programs or parameters inside the signal processing and pulse width modulating unit (211) of the processor (23).

Figure 5:
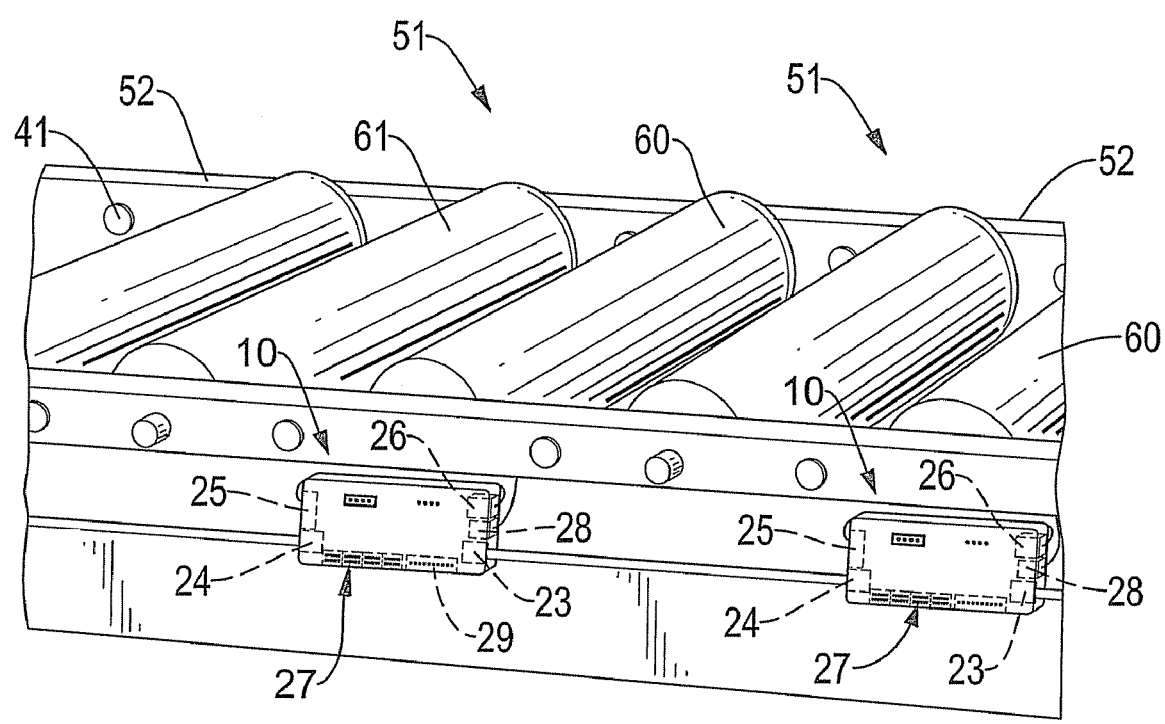
FIG. 5 is a perspective view of a portion of an accumulating conveyor system with two controllers in accordance with the present.
Figure 6:
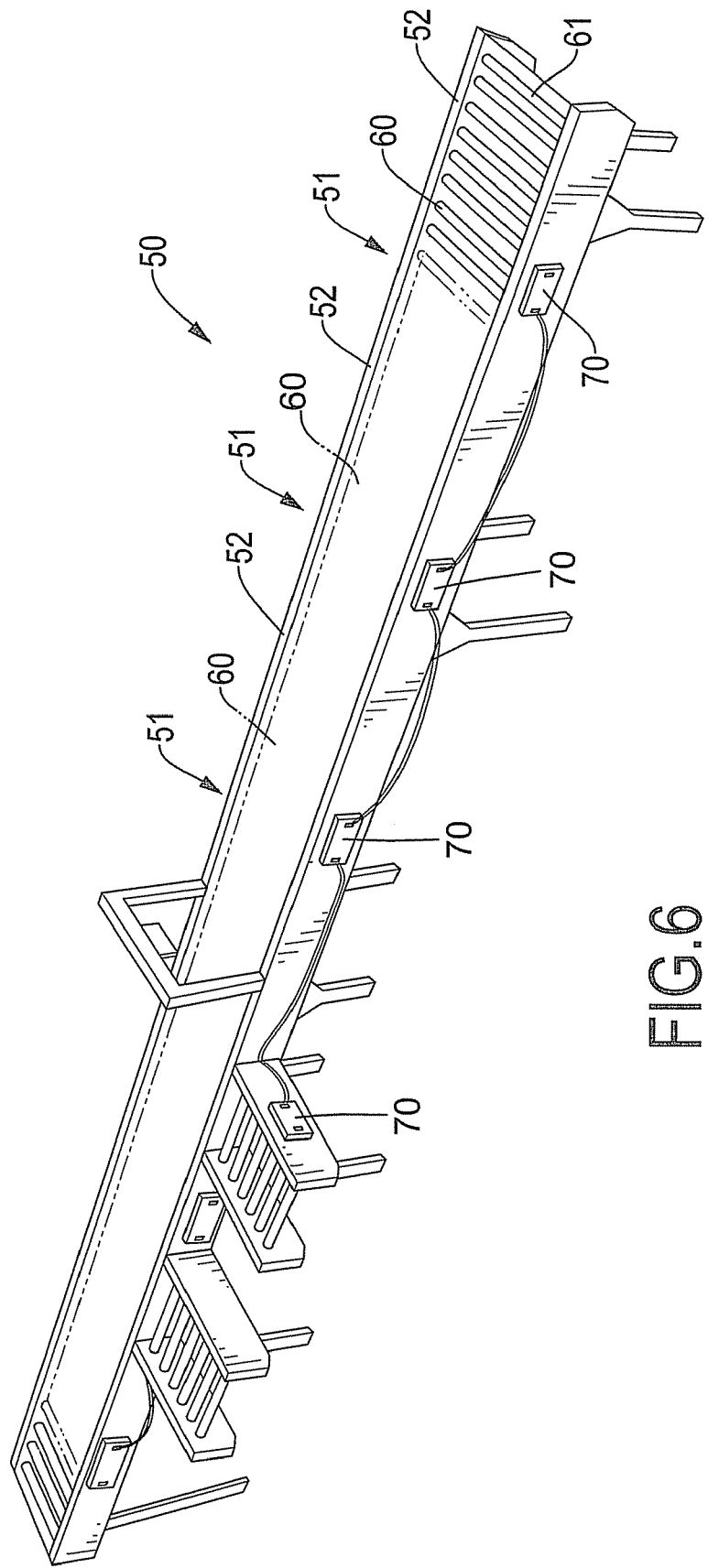
FIG. 6 is a perspective view of an accumulating conveyor system with multiple conventional drive roller controllers in accordance with prior art.
Figure 7:
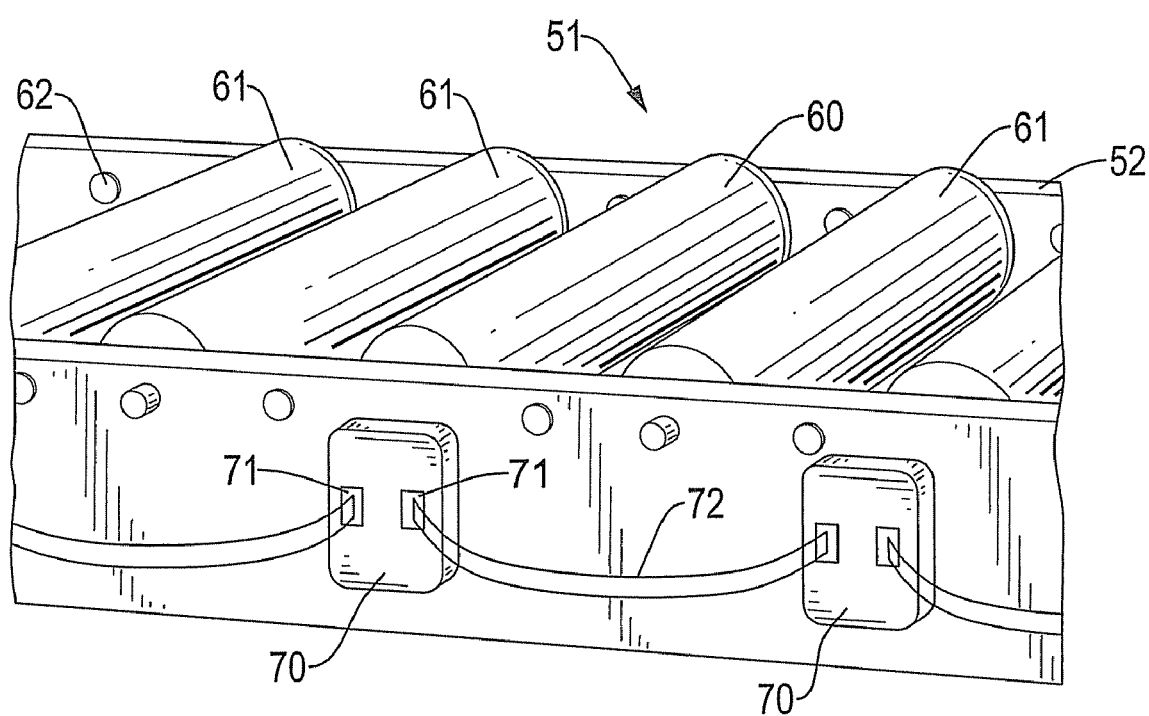
FIG. 7 is a perspective view of a portion of the accumulating conveyor system with the two conventional drive roller controllers in accordance with the prior art.

With reference to FIG. 5, two drive roller controllers (10) in accordance with the present invention are mounted a corresponding sides of the two accumulating conveyor units (51). Each drive roller controller (10) is electronically to motor, photo sensor (41) and power line through the motor connecting port (25), the photo sensor connecting port (26) and the power connecting port (28). The second communicating port (24) of the drive roller controller (10) is connected to a first communicating port (23) of the previous first drive roller controller (10) by a RJ-45 wire. Since the first and second communicating ports (23, 24) are formed on sides of the casing (11), the RJ-45 wires is not easily protruded outside of the accumulating conveyor unit (51). In addition, the input device provides different functional selections for the operator, the operator selects proper functional selections of the drive roller controllers. Therefore, the operator uses the same drive roller controllers to drive the drive rollers on the slanted accumulating conveyor unit or general accumulating conveyor unit. The installing steps are further simplified and the installing period is decreased.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A drive roller controller for an accumulating conveyor system comprising:
    a casing having two opposite sides and multiple openings respectively defined on the opposite sides;
    a circuit board mounted inside the casing and having a controlling unit, wherein the controlling unit comprises a processor, a three-phase inverter, a first communicating port and a second communicating port, a motor connecting port, a photo sensor connecting port, an input device and a power source port, wherein the first and second communicating ports are respectively mounted inside openings on the opposite sides of the casing;

the processor comprises:
a signal processing and pulse width modulating unit electronically connected to the three-phase inverter, wherein the three-phase inverter is adapted to electronically connect a motor through the motor connecting port;

an analog to digital converter electronically connected to the power source port and the signal processing and pulse width modulating unit, wherein the signal processing and pulse width modulating unit obtains a present voltage of a power source through the analog to digital converter;

an inverting time sequence signal generating unit electronically connected to the signal processing and pulse width modulating unit and adapted to electronically connect Hall signal wires of the motor, wherein the inverting time sequence signal generating unit generates and outputs inverting time sequence signals according to Hall signals of the motor; and a general purpose input and output interface electronically connected to the signal processing and pulse width modulating unit, the first and second communicating ports, the photo sensor connecting port and the input device; and the three-phase inverter comprises:
a full-bridge switching circuit having:
three upper-aim switches, each of which has a controlling terminal; and
three lower-arm switches respectively electronically connected to the upper-arm switches in serial and each lower-arm switch having a controlling terminal;

a first switch driver electronically connected to the controlling terminals of the upper-aim switches and the signal processing and pulse width modulating unit, wherein the signal processing and pulse width modulating unit turns the upper-arm switches on and off, and controls a conductive time of each upper-arm switch through the first switch driver according to the inverting time sequence signals; and a second switch driver electronically connected to the controlling terminals of the lower-arm switches and the signal processing and pulse width modulating unit, wherein the signal processing and pulse width modulating unit turns the lower-arm switches on and off, and controls a conductive time of each lower-arm switch through the second switch driver according to the inverting time sequence signals.

2. The drive roller controller as claimed in claim 1, wherein the controlling unit further comprises an auxiliary connecting port is electronically connected to the signal processing and pulse width modulating unit through the general purpose input and output interface.

3. The drive roller controller as claimed in claim 1, wherein the controlling unit further comprises:
a temperature sensor mounted inside the casing and electronically connected to the signal processing and pulse width modulating unit through the analog to digital converter; and an indicator mounted outside the casing and electronically connected to the signal processing and pulse width modulating unit through the general purpose input and output interface.

4. The drive roller controller as claimed in claim 2, wherein the controlling unit further comprises:
a temperature sensor mounted inside the casing and electronically connected to the signal processing and pulse width modulating unit through the analog to digital converter; and an indicator mounted outside the casing and electronically connected to the signal processing and pulse width modulating unit through the general purpose input and output interface.

5. The drive roller controller as claimed in claim 3, wherein the full-bridge switching circuit is further serially and electronically connected to a resistor and the resistor is electronically connected to the analog to digital converter through a signal amplifier, so the signal processing and pulse width modulating unit determines whether an over-current status is occurred occurs.

6. The drive roller controller as claimed in claim 4, wherein the full-bridge switching circuit is further serially and electronically connected to a resistor and the resistor is electronically connected to the analog to digital converter through a signal amplifier, so the signal processing and pulse width modulating unit determines whether an over-current status occurs.

7. The drive roller controller as claimed in claim 5, wherein each of the upper-arm switches and the lower-arm switches is a MOSFET or IGBT.

8. The drive roller controller as claimed in claim 6, wherein each of the upper-arm switches and the lower-arm switches is a MOSFET or IGBT.

9. The drive roller controller as claimed in claim 3, wherein
the first communicating port at least comprises a photo sensor signal output, a photo sensor signal input of a previous first accumulating conveyor unit, an error and abnormal signal input of the previous first accumulating conveyor unit, a motor status signal input of a previous first accumulating conveyor unit, a motor status output and a photo sensor signal output of a previous second accumulating conveyor unit; and the second communicating port at least comprises a photo sensor signal input of a next accumulating conveyor unit, a photo sensor signal output, an abnormal alarm signal output, an error and abnormal signal output, a motor status signal output, a motor status signal input of the next accumulating conveyor unit and a previous second photo sensor signal input.

10. The drive roller controller as claimed in claim 4, wherein
the first communicating port at least comprises a photo sensor signal output, a photo sensor signal input of a previous first accumulating conveyor unit, an error and abnormal signal input of the previous first accumulating conveyor unit, a motor status signal input of a previous first accumulating conveyor unit, a motor status output and a photo sensor signal output of a previous second accumulating conveyor unit; and the second communicating port at least comprises a photo sensor signal input of a next accumulating conveyor unit, a photo sensor signal output, an abnormal alarm signal output, an error and abnormal signal output, a motor status signal output, a motor status signal input of the next accumulating conveyor unit and a previous second photo sensor signal input.

11. The drive roller controller as claimed in claim 9, wherein each of the inputs and outputs of the first and second communicating ports is electronically connected to a comparator.

12. The drive roller controller as claimed in claim 10, wherein each of the inputs and outputs of the first and second communicating ports is electronically connected to a comparator.

13. The drive roller controller as claimed in claim 11, wherein the first and second communicating ports are RJ-45 ports.

14. The drive roller controller as claimed in claim 12, wherein the first and second communicating ports are RJ-45 ports.

15. The drive roller controller as claimed in claim 3, wherein the motor connecting port comprises three current input terminals, three hall signal outputs, a motor temperature signal output and an electronic braking signal output.

16. The drive roller controller as claimed in claim 4, wherein the motor connecting port comprises three current input terminals, three hall signal outputs, a motor temperature signal output and an electronic braking signal output.

17. The drive roller controller as claimed in claim 15, wherein the hall signal outputs are electronically connected to the inverting time sequence signal generating unit through corresponding signal amplifiers.

18. The drive roller controller as claimed in claim 16, wherein the hall signal outputs are electronically connected to the inverting time sequence signal generating unit through corresponding signal amplifiers.

19. The drive roller controller as claimed in claim 3, wherein the photo sensor connecting port comprises a power source input, photo sensor status output and a normal or alarm status of the photo sensor output.

20. The drive roller controller as claimed in claim 4, wherein the photo sensor connecting port comprises a power source input, photo sensor status output and a normal or alarm status of the photo sensor output.

21. The drive roller controller as claimed in claim 19, wherein the normal or alarm status of the photo sensor output is electronically connected to the general purpose input and output interface through a comparator.

22. The drive roller controller as claimed in claim 20, wherein the normal or alarm status of the photo sensor output is electronically connected to the general purpose input and output interface through a comparator.

23. The drive roller controller as claimed in claim 3, wherein the input device comprises a first dip switch, a second dip switch, a third dip switch and a fourth dip switches respectively connected to the general purpose input and output interface.

24. The drive roller controller as claimed in claim 4, wherein the input device comprises a first dip switch, a second dip switch, a third dip switch and a fourth dip switch respectively connected to the general purpose input and output interface.

25. The drive roller controller as claimed in claim 23, wherein
the first dip switch sets a motor speed and a timer of the processor;
the second dip switch sets an order of the accumulating conveyor unit, enables response to the normal or alarm status of the photo sensor, sets operating mode of the photo sensor, and stops motor rotating;
the third dip switch sets rotating direction of the motor, increases the speed of the motor and decreases the speed of the motor; and
the fourth dip switch sets a standard torque, a high speed and torque mode and high torque mode.

26. The drive roller controller as claimed in claim 24, wherein
the first dip switch sets a motor speed and a timer of the processor;
the second dip switch sets an order of the accumulating conveyor unit, enables response to the normal or alarm status of the photo sensor, sets operating mode of the photo sensor, and stops motor rotating;
the third dip switch sets rotating direction of the motor, increases the speed of the motor and decreases the speed of the motor; and
the fourth dip switch sets a standard torque, a high speed and torque mode and high torque mode.

27. The drive roller controller as claimed in claim 2, wherein the auxiliary connecting port comprises a rotating direction of the motor and speed controlling terminal, a photo sensor signal output, an error and abnormal output, an abnormal alarm output and a motor status output.

28. The drive roller controller as claimed in claim 1, wherein the power source port is electronically connected to a power converter and a voltage regulator and the voltage regulator supplies various voltages.

29. The drive roller controller as claimed in claim 2, wherein the power source port is electronically connected to a power converter and a voltage regulator and the voltage regulator supplies various voltages.

30. The drive roller controller as claimed in claim 3, wherein the controlling unit further comprises a serial input and output port electronically connected to the general purpose input and output interface through a signal converter.

31. The drive roller controller as claimed in claim 4, wherein the controlling unit further comprises a serial input and output port electronically connected to the general purpose input and output interface through a signal converter.

32. The drive roller controller as claimed in claim 30, wherein the signal converter is a ST3232 converter and the serial input and output port is an RS-232 port.

33. The drive roller controller as claimed in claim 31, wherein the signal converter is a ST3232 converter and the serial input and output port is an RS-232 port.

* * * * *

UNITED STATES PATENT AND TRADEMARK OFFICE
CERTIFICATE OF CORRECTION

PATENT NO.         : 8,042,681 B2
APPLICATION NO.    : 12/261289
DATED              : October 25, 2011
INVENTOR(S)        : William Chuang It is certified that error appears in the above-identified patent and that said Letters Patent is hereby corrected as shown below:

Column 7

*Line 56* Claim 1: please delete "is" after "port"

Column 8

*Lines 20-21* Claim 5: please delete "is occurred"

Column 9

*Line 51* Claim 23: please change "switches" to --switch--

Signed and Sealed this
Tenth Day of January, 2012

David J. Kappos
*Director of the United States Patent and Trademark Office*

UNITED STATES PATENT AND TRADEMARK OFFICE
CERTIFICATE OF CORRECTION

PATENT NO.         : 8,042,681 B2
APPLICATION NO.    : 12/261289
DATED              : October 25, 2011
INVENTOR(S)        : William Chuang Page 1 of 1

It is certified that error appears in the above-identified patent and that said Letters Patent is hereby corrected as shown below:

<u>Column 7</u>

*Line 56* Claim 2: please delete "is" after "port"

<u>Column 8</u>

*Lines 20-21* Claim 5: please delete "is occurred"

<u>Column 9</u>

*Line 51* Claim 23: please change "switches" to --switch--

This certificate supersedes the Certificate of Correction issued January 10, 2012.

Signed and Sealed this
First Day of May, 2012

David J. Kappos
*Director of the United States Patent and Trademark Office*